(12) United States Patent
Shimmoto

(10) Patent No.: US 8,300,247 B2
(45) Date of Patent: Oct. 30, 2012

(54) IMAGE PROCESSING APPARATUS AND IMAGE PROCESSING METHOD

(75) Inventor: Takafumi Shimmoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1446 days.

(21) Appl. No.: 11/668,983

(22) Filed: Jan. 30, 2007

(65) Prior Publication Data
US 2007/0185753 A1 Aug. 9, 2007

(30) Foreign Application Priority Data

Feb. 3, 2006 (JP) .................................. 2006-027251
Jan. 22, 2007 (JP) .................................. 2007-011722

(51) Int. Cl.
G06F 3/12 (2006.01)
G06K 15/00 (2006.01)

(52) U.S. Cl. ...................... 358/1.15; 358/1.18; 358/1.13
(58) Field of Classification Search ......... 358/1.12–1.18
See application file for complete search history.

(56) References Cited

U.S. PATENT DOCUMENTS

| 5,915,111 | A * | 6/1999 | Ouchi | 718/107 |
| 7,730,490 | B2 * | 6/2010 | Ito | 718/106 |
| 2003/0028685 | A1 | 2/2003 | Smith et al. | |
| 2003/0103232 | A1 * | 6/2003 | Twede | 358/1.15 |
| 2003/0214684 | A1 * | 11/2003 | Kuboki | 358/474 |
| 2004/0193717 | A1 | 9/2004 | Tajima et al. | |
| 2005/0166184 | A1 * | 7/2005 | Takao | 717/117 |
| 2008/0040676 | A1 * | 2/2008 | Garg et al. | 715/762 |

FOREIGN PATENT DOCUMENTS

| EP | 1 376 331 A2 | 1/2004 |
| JP | 7-295918 | 11/1995 |
| JP | 2000-112865 | 4/2000 |
| JP | 2002-84383 | 3/2002 |
| JP | 2002-314731 | 10/2002 |
| JP | 2003-162389 | 6/2003 |
| JP | 2004-62889 | 2/2004 |
| JP | 2004-163997 | 6/2004 |
| JP | 2004-206694 | 7/2004 |
| JP | 2004-355504 | 12/2004 |
| JP | 2005-217825 | 8/2005 |

OTHER PUBLICATIONS

Office Action issued Jun. 20, 2011, in Japanese Patent Application No. 2007-011722.

* cited by examiner

Primary Examiner — Dov Popovici
(74) Attorney, Agent, or Firm — Oblon, Spivak, McClelland, Maier & Neustadt, L.L.P.

(57) ABSTRACT

A disclosed image processing apparatus executes an application relevant to image processing. The image processing apparatus includes a request analyzing layer configured to analyze a user-specified request requesting a service; and a workflow control layer configured to control a workflow corresponding to the service in response to a request requesting execution of the service received from the request analyzing layer, the workflow causing one or more function process units to be combined and to serve as application.

16 Claims, 19 Drawing Sheets

IMAGE PROCESSING APPARATUS AND IMAGE PROCESSING METHOD

BACKGROUND OF THE INVENTION

1. Field of the Invention

The present invention relates to an image processing apparatus provided with an architecture enabling development of an application realized by a workflow including a combination of plural function process units.

2. Description of the Related Art

In recent years, there have generally become known image processing apparatuses in which functions of a printer, a copier, a facsimile machine, a scanner, etc., are housed in a single chassis. Such a multifunctional image processing apparatus includes a display unit, a printing unit, and an imaging unit, and three types of applications corresponding to the printer, the copier, and the fax machine provided in a single chassis. By switching from one application to another, the apparatus is caused to operate as a printer, a copier, a facsimile machine, or a scanner (see, for example, Patent Document 1).

The plural applications that operate in such a multifunctional image processing apparatus have an enormous number of functions, and are becoming more and more complex as software is becoming large-scale. Furthermore, the multifunctional image processing apparatus does not only operate as a stand-alone device, but also operates in a distributed computing environment. Accordingly, the multifunctional image processing apparatus can provide new advantages by using the Web and by operating in cooperation with other devices.

For example, there is proposed a technology by which a user of a mobile device can access a printing service via the Internet, specify the location where a document is stored with a URL, and send a print request to a multifunctional image processing apparatus (see, for example, Patent Document 2).

Furthermore, when a new printer resource is connected to a network in a distributed computing environment, the resource can be downloaded if it conforms to predetermined conditions, so that the multifunctional image processing apparatus can operate in the distributed computing environment (see, for example, Patent Document 3).

Moreover, there is a proposed application program interface for facilitating use of a network software platform configured with applications and computer hardware (see, for example, Patent Document 4).

Patent Document 1: Japanese Laid-Open Patent Application No. 2002-084383
Patent Document 2: Japanese Laid-Open Patent Application No. 2004-062889
Patent Document 3: Japanese Laid-Open Patent Application No. 2004-355504
Patent Document 4: US Patent Publication No. 2003/028685

In the technology disclosed in Patent Document 1, plural applications and operating systems are divided into separate hierarchies so that different applications can control hardware resources such as a printer and a scanner without being affected by the differences. In the technology disclosed in Patent Document 2, services using the Web are expanded. The technology disclosed in Patent Document 3 helps prevent the increase of processes required for downloading data via the Web. The technology disclosed in Patent Document 4 facilitates operations of changing applications and hardware of the computer.

Although these technologies have significantly enhanced the possibility of applying new applications, each application needs to be developed to perform a sequence of operations, thus increasing the workload required to develop each application.

SUMMARY OF THE INVENTION

The present invention provides an image processing apparatus and an image processing method in which one or more of the above-described disadvantages are eliminated.

A preferred embodiment of the present invention provides an image processing apparatus and an image processing method provided with an architecture enabling development of an application realized by a workflow including a combination of plural function process units.

An embodiment of the present invention provides an image processing apparatus for executing an application relevant to image processing, the image processing apparatus including a request analyzing layer configured to analyze a user-specified request requesting a service; and a workflow control layer configured to control a workflow corresponding to the service in response to a request requesting execution of the service received from the request analyzing layer, the workflow causing one or more function process units to be combined and to serve as said application.

An embodiment of the present invention provides an image processing method for executing an application relevant to image processing, the image processing method including a first step of starting a service in response to a user-specified request requesting the service, the first step being performed in a request analyzing layer for analyzing the user-specified request; and a second step of receiving a request requesting execution of the service in response to the first step being performed, combining one or more function process units to configure a workflow corresponding to the service and to serve as said application, and sending requests to the one or more function process units according to the workflow, the second step being performed in a workflow control layer for controlling the workflow.

According to one embodiment of the present invention, the workload required for developing an application can be reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
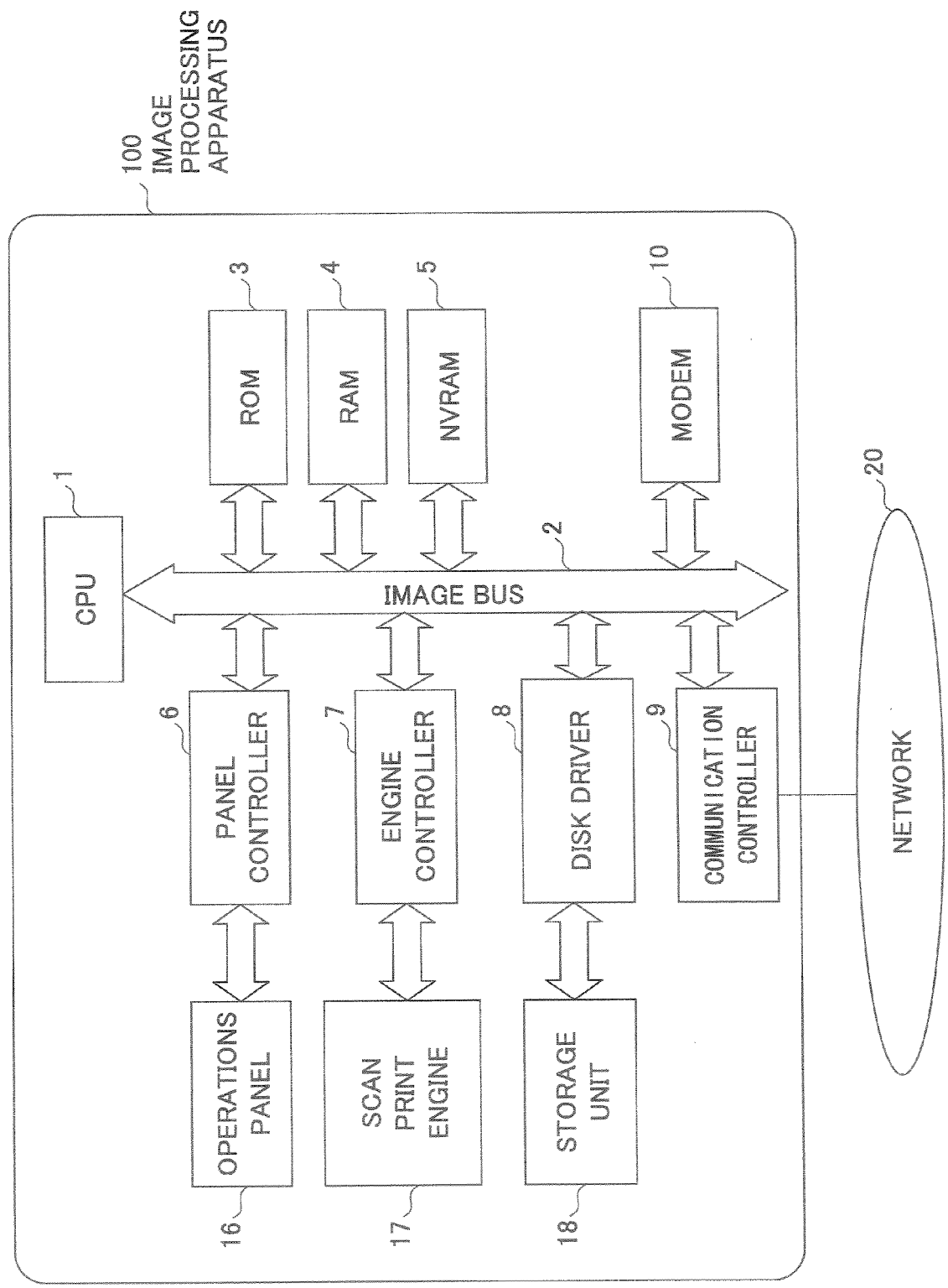
FIG. 1 is a block diagram of a hardware configuration of an image processing apparatus according to an embodiment of the present invention.

FIG. 1 is a block diagram of a hardware configuration of an image processing apparatus according to an embodiment of the present invention.

As shown in FIG. 1, an image processing apparatus 100 includes a CPU (Central Processing Unit) 1, a ROM (Read Only Memory) 3, a RAM (Random Access Memory) 4, a NVRAM (nonvolatile RAM) 5, a panel controller 6, an engine controller 7, a disk driver 8, a communication controller 9, and a modem 10, which are interconnected via an image bus 2. The image processing apparatus 100 further includes an operations panel 16, a scan print engine 17, and a storage unit 18.

The CPU 100 controls all units of the image processing apparatus 100. The ROM 3 initially stores permanent data such as programs for realizing processes relative to an embodiment of the present invention. The RAM 4 holds various data in a rewritable manner. The NVRAM 5 stores necessary data without losing them.

The image bus 2 also interconnects the communication controller 9 configured to connect the image processing apparatus 100 with a network 20, the operations panel 16 including an LCD touch panel functioning as an interface between a user via the panel controller 6, the scan print engine 17 that causes a scanner and a printer to input/output image data (scan a paper original and print data onto transfer paper) via the engine controller 7, the storage unit 18 that is an HDD used for storing image data and control programs via the disk driver 8, and the modem 10 that exchanges data and fax documents with an external device via a public line.

As described above, the image processing apparatus 100 is provided with various applications corresponding to at least printing, copying, and fax transmitting functions so as to operate as a printer, a copier, a scanner, or a fax machine.

Figure 2:
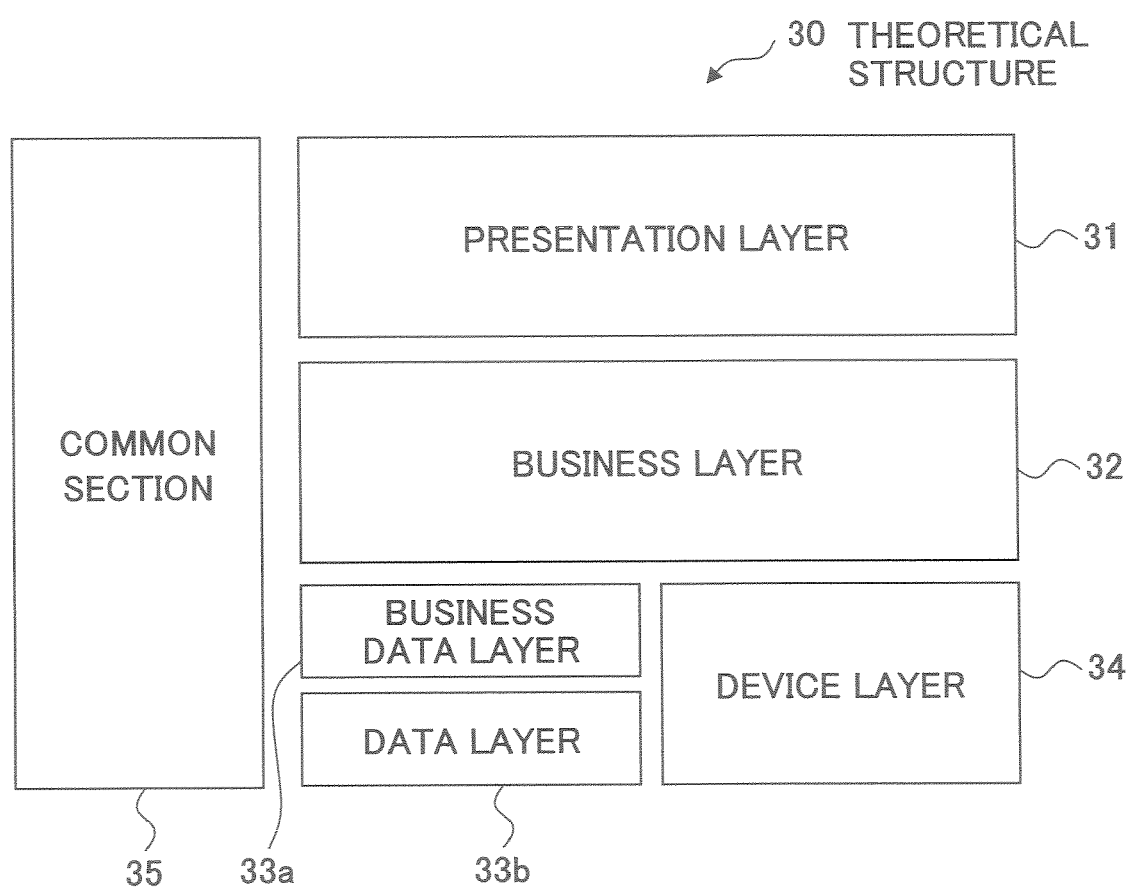
FIG. 2 illustrates a theoretical structure of various applications of the image processing apparatus according to an embodiment of the present invention.

FIG. 2 illustrates a theoretical structure of various applications of the image processing apparatus 100. This structure systemizes the applications necessary for operating in a distributed computing environment.

As shown in FIG. 2, the image processing apparatus 100 is configured with a theoretical structure 30 of applications for a distributed computing environment, including a presentation layer 31, a business layer 32, a business data layer 33a, a data layer 33b, a device layer 34, and a common section 35.

The presentation layer 31 analyzes a service request from a user and specifies a service to be provided by the business layer 32. The presentation layer 31 serves as a contact point for a system using the image processing apparatus 100 to receive user requests and requests from Web services made via the operations panel 16 or a browser, etc. The business layer 32 is used for analyzing a service request received by the image processing apparatus 100, realizing the request, and presenting information to be fed back from the business layer 32 to the request source.

The business layer 32 is used for creating logic corresponding to the requested service by combining plural process units each representing a function (hereinafter, "function process unit") of the device layer 34. The logic of the business layer 32 is used by applications for performing image processing and document operations using the scan print engine 17. Specifically, a workflow (business flow) is presented to the user, and at least one of the data layer 33b, the device layer 34, and the common section 35 is used for receiving user operation, performing an authentication process, performing image processing, inputting/outputting a document, and performing a charging process. For example, to perform operations relevant to a document, the business layer 32 performs scheduling for rearranging the logical process order.

The business layer 32 forms a workflow according to a requested content. This is different from a request specifying an application as in the conventional technology, and therefore, such a requested content is referred to as a "service".

The business data layer 33a is used for handling data expressing a concept existing in the real world as an entity. The business data layer 33a comprehends contents of the data that is an object of operation and executes all requested processes. Examples of the data that is an object of operation are an account, a stored document, an address book, the structure and capabilities of a device, specification information, and image data, which are expressed as entities. The business data layer 33a is aware of where the data is to be saved (local/remote), and instructs the data layer 33b to send/receive data to/from the physical device including the actual storage area. Examples of actual physical devices serving as local storage areas are the ROM 3, the RAM 4, the NVRAM 5, and the storage unit 18.

The data layer 33b is used for performing processes on the entity corresponding to the data requested by the business data layer 33a and sends/receives data to/from a local/remote saving area. The data layer 33b provides a service for accessing the local/remote data saving area. The data layer 33b detects the status of the physical device and performs scheduling for a process request according to the capability of the physical device.

The device layer 34 controls the scan print engine 17 to scan an original or to print a document, and also exchanges image information (process, convert format, etc.). The device layer 34 detects the status of the scan print engine 17 and performs scheduling for the process request according to the capability of the scan print engine 17. The service provided by the device layer 34 is used from the business layer 32.

The common section 35 performs memory management and communication control, and is capable of receiving requests from any one of the presentation layer 31, the business layer 32, the data layer 33b, and the device layer 34.

The image processing apparatus 100 according to an embodiment of the present invention realizes an application by performing a sequence of processes based on the theoretical structure 30 shown in FIG. 2, with an object-oriented configuration of a combination of plural classes and a process flow determined according to relationships between the plural classes. Hereinafter, a class diagram refers to a diagram in which the plural classes and the process flow determined according to relationships between the plural classes are superposed on the theoretical structure 30 shown in FIG. 2. The process flow is indicated by dashed lines.

Figure 3:
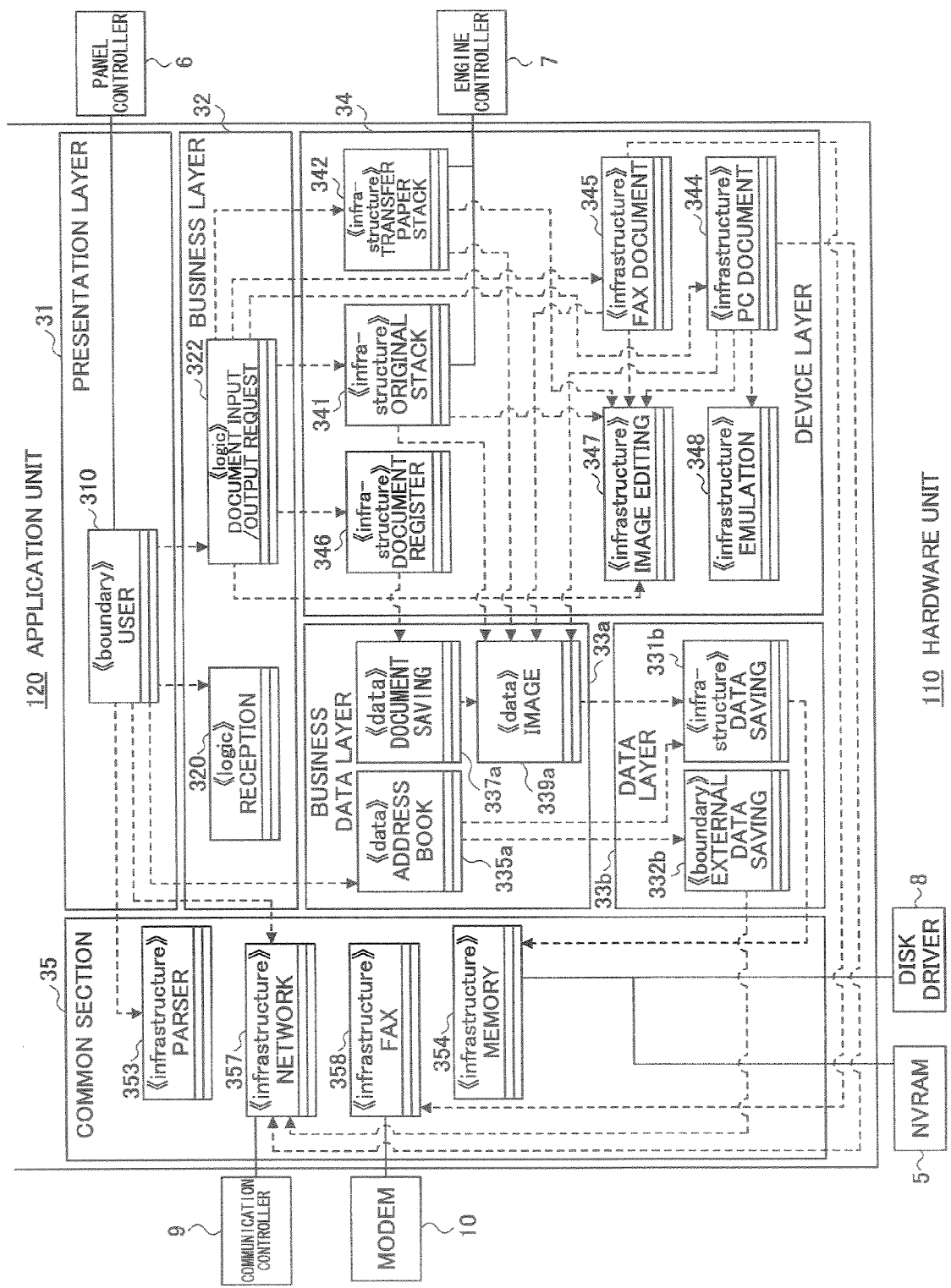
FIG. 3 is a class diagram based on the theoretical structure shown in FIG. 2.

FIG. 3 is a class diagram based on the theoretical structure 30 shown in FIG. 2, illustrating all processes performed by the image processing apparatus 100. In FIG. 3, in the image processing apparatus 100, an application unit 120 includes the theoretical structure 30 shown in FIG. 2 and a hardware unit 110 includes the NVRAM 5, the panel controller 6, the engine controller 7, the disk driver 8, the communication controller 9, and the modem 10.

The presentation layer 31 includes a user class 310 for receiving an event from outside. The user class 310 sends an instruction to the business layer 32 to form a workflow by combining plural function process units and execute the workflow as an application. When a single application is to be executed without forming a workflow (hereinafter, "single application"), an instruction is given to the class corresponding to the application. The user class 310 causes the panel controller 6 to control the user interface.

An application in which a workflow is formed by combining together plural function process units performs image processing by conveying a physical sheet of paper, performing at least one of scanning, printing, fax transmission, and image editing, etc., each corresponding to a function process unit.

A single application performs data processing that does not involve image processing or image editing by conveying a physical sheet of paper.

The business layer 32 includes a reception class 320 and a document input/output request class 322. The reception class manages the start and the end of a process or a sequence in response to a request from the user class 310 of the presentation layer 31. The document input/output request class 322 issues a request for performing image forming or image operation, etc., with a sequence of processes.

The business data layer 33a includes an address book class 335a, a document saving class 337a, and an image class 339a. The address book class 335a accesses an address book. The address book is saved in a physical storage area, which address book is data expressing a conceptual address book as an entity (hereinafter, "address book"). The document saving class 337a causes the image class 339a to write and save a document (image information) into a predetermined storage area in response to a request from a document register class 346 of the device layer 34. The image class 339a causes a data saving class 331b of the data layer 33b to write in/read from a memory class 354 a document (image information).

The data layer 33b includes the data saving class 331b and an external data saving class 332b. The data saving class 331b accesses data in a storage area inside the image processing apparatus 100 in response to a request from the business data layer 33a.

The device layer 34 includes an original stack class 341, a transfer paper stack class 342, a PC document class 344, a fax document class 345, the document register class 346, and an emulation class 348 for performing predetermined process by controlling the scan print engine 17 in response to a request from the business layer 32.

The original stack class 341 scans a stack of originals including one or more sheets placed in the image processing apparatus 100 by controlling the scan print engine 17 and causes the image class 339a to save the obtained image information in a predetermined storage area, in response to a request from the document input/output request class 322.

The transfer paper stack class 342 causes the image class 339a to read the image information obtained by scanning the original stack and transfers the image information onto a sheet of paper by controlling the scan print engine 17, in response to a request from the document input/output request class 322 of the business layer 32.

The PC document class 344 causes a network class 357 of the common section 35 to receive an image (document data) from outside via the network 20, causes the emulation class 348 to convert the image (document data) into image information for undergoing image processing in the image processing apparatus 100, and causes the image class 339a to store the image information into a predetermined storage area, in response to a request from the document input/output request class 322 of the business layer 32. When a request to edit the image information is received, the PC document class 344 causes an image editing class 347 to edit the image information.

The fax document class 345 causes the image class 339a to read image information from a predetermined storage area, causes the image editing class 347 to edit the image, and causes a fax class 358 to send out the image by fax transmission by controlling the modem 10, in response to a request from the document input/output request class 322 of the business layer 32. When the fax class 358 receives image information by fax transmission, the fax document class 345 causes the image class 339a to save the image information in a predetermined storage area.

The document register class 346 performs a process to register image information, and causes the document saving class 337a to save the image information in a storage area in the image processing apparatus 100, in response to a request from the document input/output request class 322 of the business layer 32.

The image editing class 347 performs image editing in response to a request from another class of the device layer 34.

The emulation class 348 converts the formats of images (data files in various data formats) received from outside into a predetermined format for performing an image forming operation and acquires the converted image information in response to a request from another class of the device layer 34.

The common section 35 is commonly used by the presentation layer 31, the business layer 32, the data layer 33b, and the device layer 34. The common section 35 includes a parser class 353, the memory class 354, the network class 357, and the fax class 358.

The parser class 353 analyzes the contents of a request received from outside in response to a request from the user class 310 of the presentation layer 31.

The memory class 354 saves specified image information into a specified storage area in the NVRAM 5 or the disk driver 8, and reads specified image information from a specified storage area, in response to a request from the data layer 33b.

The network class 357 receives image information from the network 20 via the communication controller 9 and sends specified image information saved in the image processing apparatus 100 to a predetermined device via the network 20, in response to a request from the data layer 33*b* and the device layer 34. The fax class 358 receives/transmits fax data by controlling the modem 10.

The sequences of processes are described below with reference to class diagrams and process sequence diagrams. In the process sequence diagrams described below, when an instance of a class is created according to need, the class is created by <<create>> and deleted (destroyed) by <<destroy>>. Instances of other classes are initially created when the image processing apparatus 100 is started up, and reside in a predetermined storage area until the power of the image processing apparatus 100 is turned off.

First, the process of a single application is described with reference to FIGS. 4-7.

Figure 4:
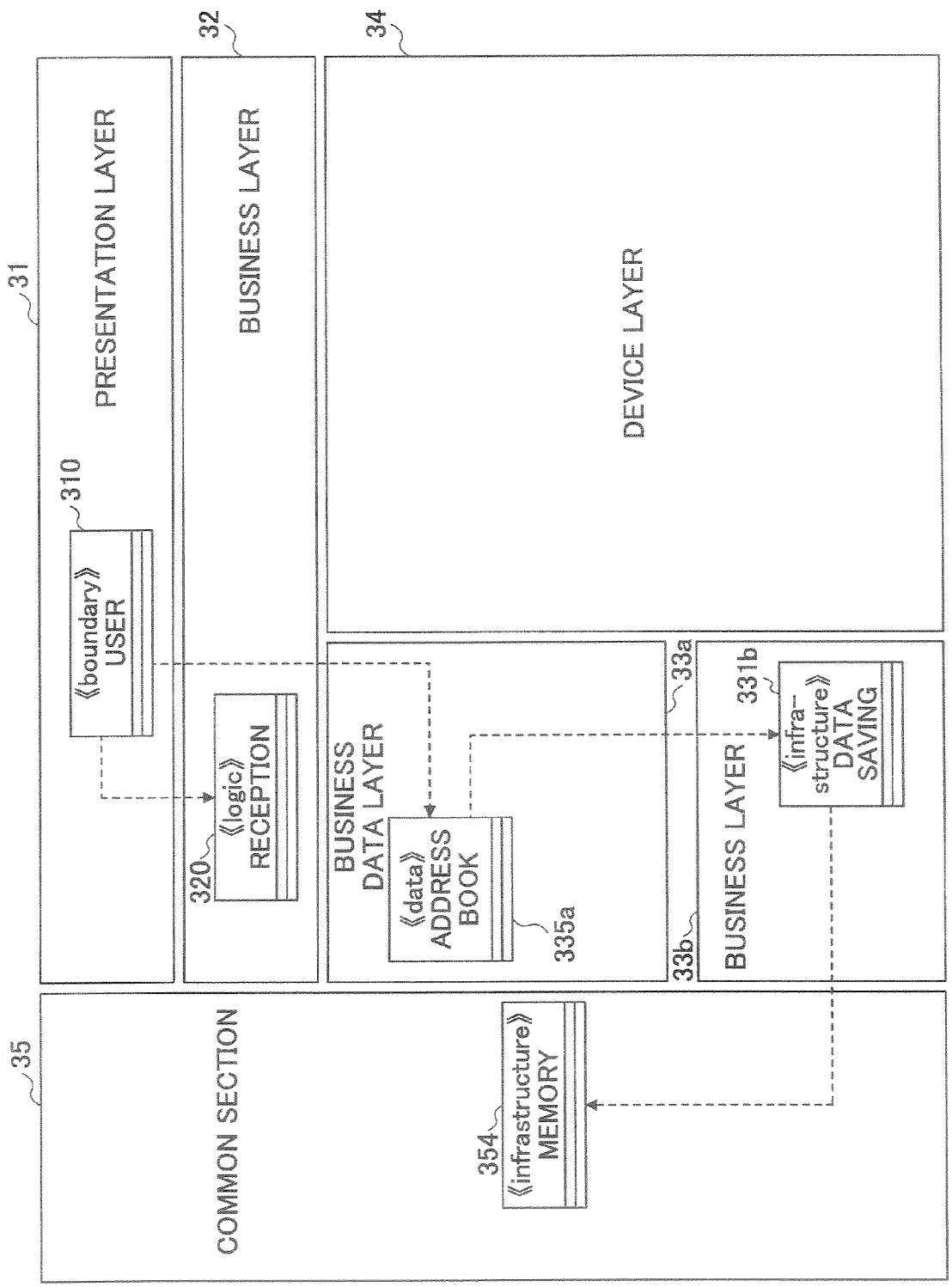
FIG. 4 is a class diagram illustrating a process of editing address book information.

FIG. 4 is a class diagram illustrating a process of editing address book information. As shown in FIG. 4, the user class 310 of the presentation layer 31 reports to the reception class 320 of the business layer 32 that a sequence has started, and sends a request to an address book class 335*a* of the business data layer 33*a* to perform search, reference, or registration processes to edit the address book information.

The address book class 335*a* sends a request to the data saving class 331*b* of the data layer 33*b* for accessing an address book stored in a predetermined storage area, according to the type of process request (search, reference, registration, etc.) reported from the user class 310.

In response to a request from the address book class 335*a*, the data saving class 331*b* causes the memory class 354 of the common section 35 to access the address book, according to the type of process request (search, reference, registration, etc.).

Figure 5:
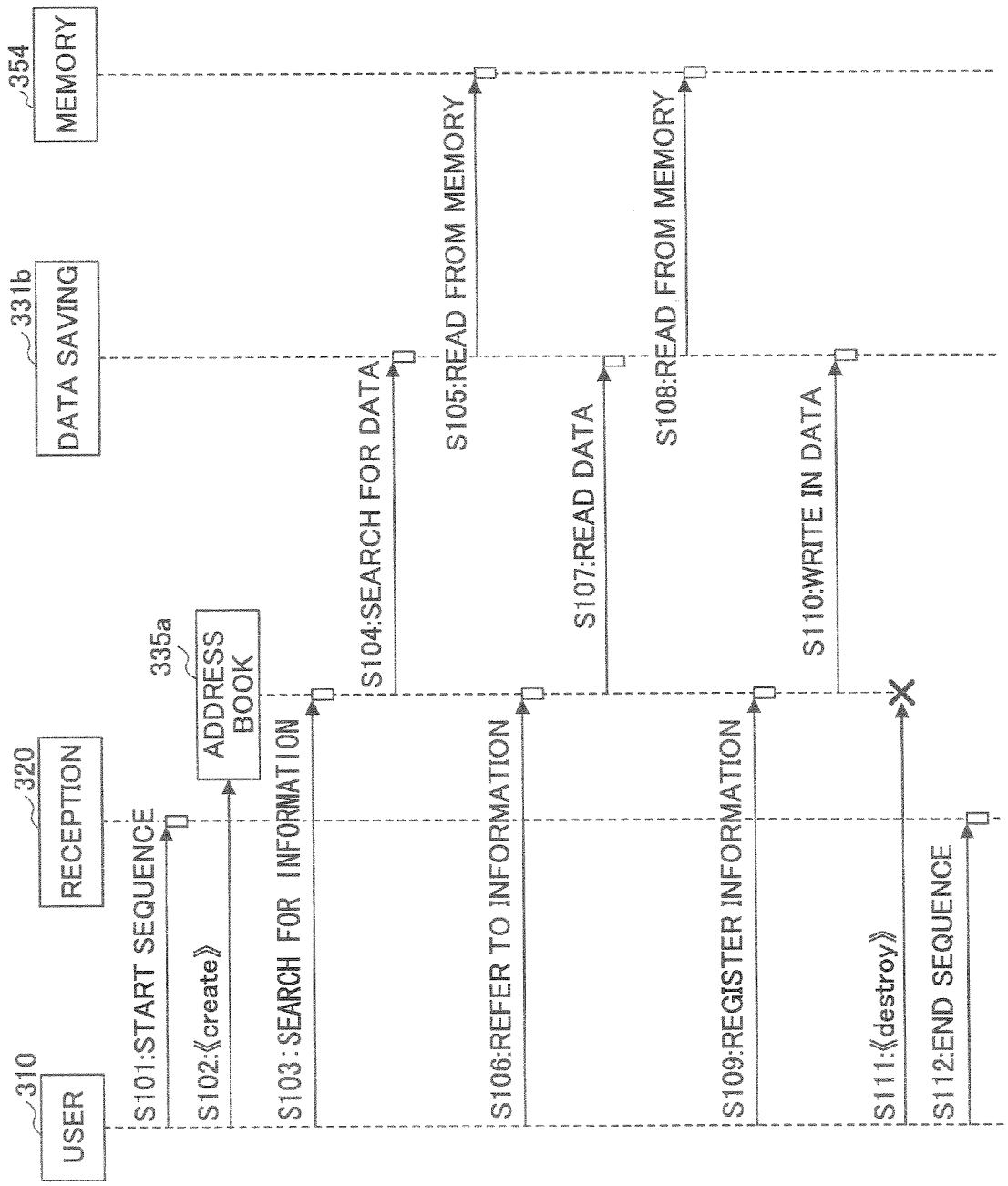
FIG. 5 is a process sequence diagram of a process of editing address book information.

FIG. 5 is a process sequence diagram of a process for editing address book information. As shown in FIG. 5, the user class 310 reports to the reception class 320 that a sequence has started (step S101). For example, the user class 310 reports to the reception class 320 that a sequence has started when the operations panel 16 is operated by a user.

The user class 310 creates an instance of the address book class 335*a* (step S102), and sends a request to the instance of the address book class 335*a* (hereinafter, simply referred to as "address book class 335*a*") to search for the information specified by the user (step S103). The address book class 335*a* sends a request to the data saving class 331*b* to search for data pertaining to the information specified by the user (step S104). The data saving class 331*b* causes the memory class 354 to read data pertaining to the user-specified information from the address book (step S105).

The user class 310 sends a request to the address book class 335*a* to refer to the user-specified information (step S106). The address book class 335*a* sends a request to the data saving class 331*b* to read data pertaining to user-specified information (step S107). The data saving class 331*b* causes the memory class 354 to read the data pertaining to the user-specified information from the address book (step S108).

The user class 310 sends a request to the address book class 335*a* to register the information specified (or input) by the user (step S109). The data saving class 331*b* causes the memory class 354 to write the data pertaining to the user-specified information into the address book (step S110).

The user class 310 deletes the instance of the address book class 335*a* (step S111), reports to the reception class 320 that the sequence has ended (step S112), and ends the process of editing the address book information.

In the process sequence shown in FIG. 5, the operations of searching for the information, referring to the information, and registering the information are described as a sequence of processes; however, only one of the operations can be executed individually.

Figure 6:
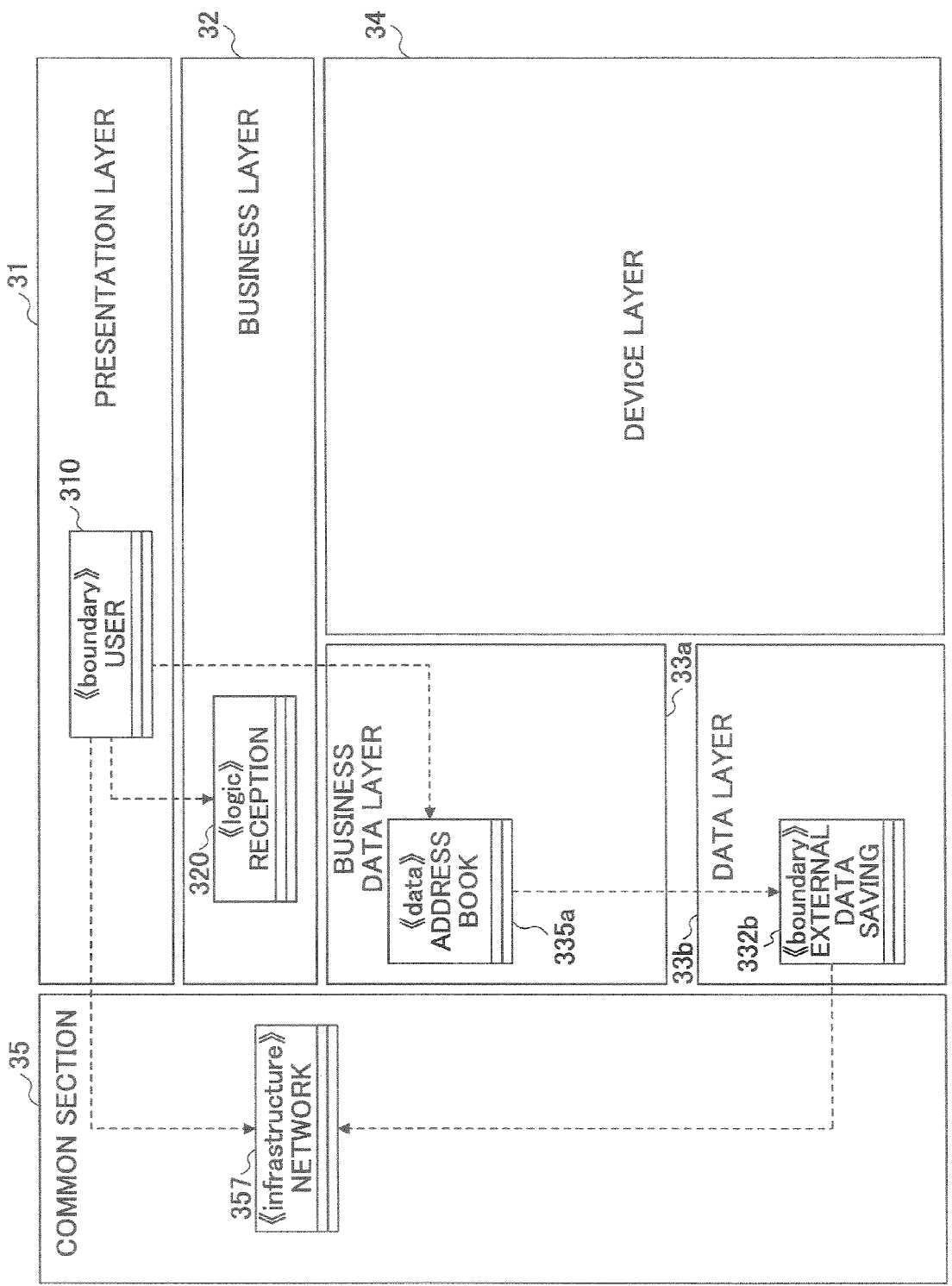
FIG. 6 is a class diagram of a process of referring to external address book information.

FIG. 6 is a class diagram of a process for referring to external address book information. As shown in FIG. 6, the user class 310 of the presentation layer 31 reports to the reception class 320 of the business layer 32 that a sequence has started, and sends a request to the address book class 335*a* of the business data layer 33*a* to perform search, reference, or registration processes for referring to or editing the external address book information.

The address book class 335*a* sends a request to the external data saving class 332*b* of the data layer 33*b* for accessing the address book stored in an external storage area, in response to the type of process request (search, reference, registration, etc.) received from the user class 310.

In response to a request from the address book class 335*a*, the external data saving class 332*b* causes the network class 357 of the common section 35 to access an address book stored in an external storage area, according to the type of process request (search, reference, registration, etc.).

Figure 7:
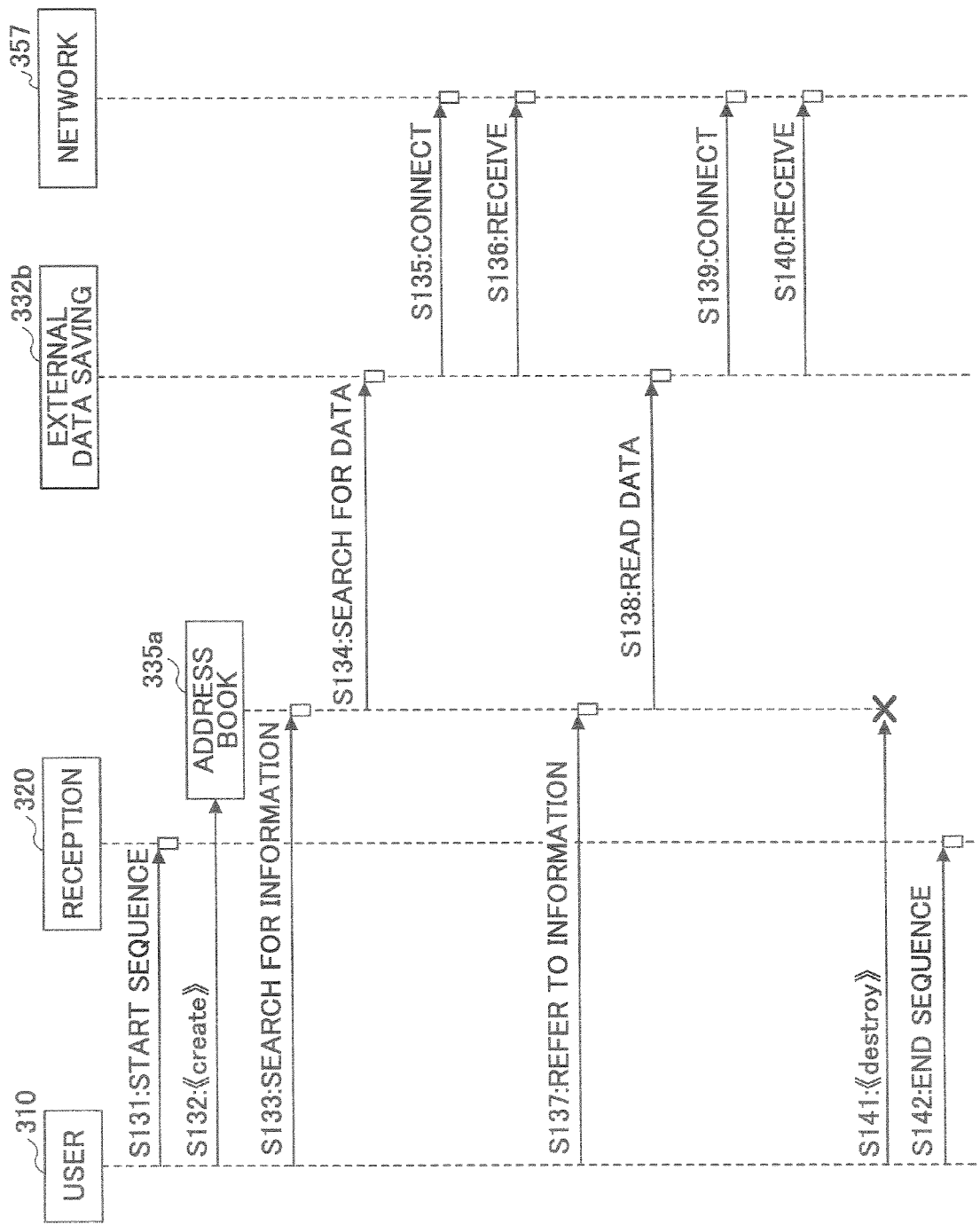
FIG. 7 is a process sequence diagram of a process of referring to external address book information.

FIG. 7 is a process sequence diagram of a process for referring to external address book information. As shown in FIG. 7, the user class 310 reports to the reception class 320 that a sequence has started (step S131). For example, the user class 310 reports to the reception class 320 that a sequence has started when the operations panel 16 is operated by a user.

The user class 310 creates an instance of the address book class 335*a* (step S132), and sends a request to the instance of the address book class 335*a* (hereinafter, simply referred to as "address book class 335*a*") to search for the information specified by the user (step S133). The address book class 335*a* sends a request to the external data saving class 332*b* to search data pertaining to the information specified by the user (step S134).

The external data saving class 332*b* sends a request to the network class 357 to connect with the external storage area in which the address book is stored (step S135). When the connection is completed by the network class 357, the external data saving class 332*b* sends a request to the network class 357 to receive the search results of the data pertaining to user-specified information (step S136). The search results are displayed on the operations panel 16.

The user class 310 sends a request to the address book class 335*a* to refer to the user-specified information (step S137). The address book class 335*a* sends a request to the external data saving class 332*b* to read the data pertaining to the user-specified information (step S138).

The external data saving class 332*b* sends a request to the network class 357 to connect with the external storage area in which the address book is stored (step S139). When the connection is completed by the network class 357, the external data saving class 332*b* sends a request to the network class 357 to receive the data pertaining to user-specified information obtained by a reading operation (step S140). The search results are displayed on the operations panel 16.

The user class 310 deletes the instance of the address book class 335*a* (step S141), reports to the reception class 320 that the sequence has ended (step S142), and ends the process of referring to external address book information.

Next, various processes performed by using the device layer 34 are described with reference to FIGS. 8-15.

Figure 8:
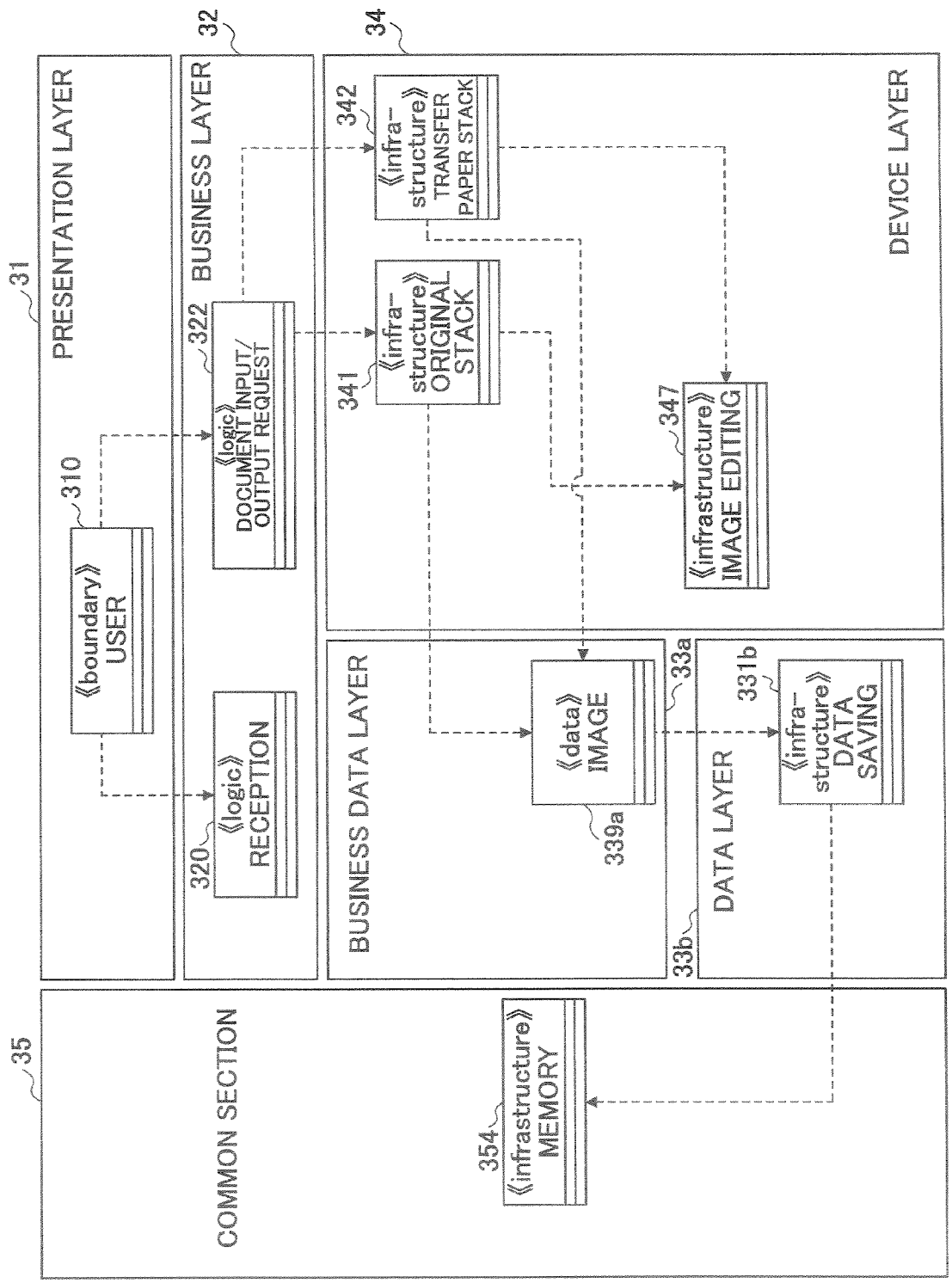
FIG. 8 is a class diagram illustrating a process of printing a paper original.

FIG. 8 is a class diagram illustrating a process of printing a paper original. As shown in FIG. 8, the user class 310 of the presentation layer 31 reports to the reception class 320 of the business layer 32 that a sequence has started, and sends a request to the document input/output request class 322 of the business layer 32 to print a paper original.

The document input/output request class 322 sends a request to the original stack class 341 of the device layer 34 to scan a paper original, and then sends a request to the transfer paper stack class 342 of the device layer 34 to print out image information obtained by scanning the paper original, in response to the request to print a paper original from the user class 310.

The original stack class 341 causes the scan print engine 17 to send a request to the image class 339a to write the image information scanned from the paper original into a storage area, and the image class 339a causes the memory class 354 to write the image information into the storage area via the data saving class 331b.

The transfer paper stack class 342 sends a request to the image class 339a to read the image information of the paper original from the storage area, and the image class 339a causes the scan print engine 17 to print out the image information read from the memory class 354 via the data saving class 331b.

As described above, the document input/output request class 322 of the business layer 32 combines the original stack class 341 with the transfer paper stack class 342 in the device layer 34 to execute them as a sequence of processes for printing a paper original, in response to a request to print a paper original from the user class 310 of the presentation layer 31.

Figure 9:
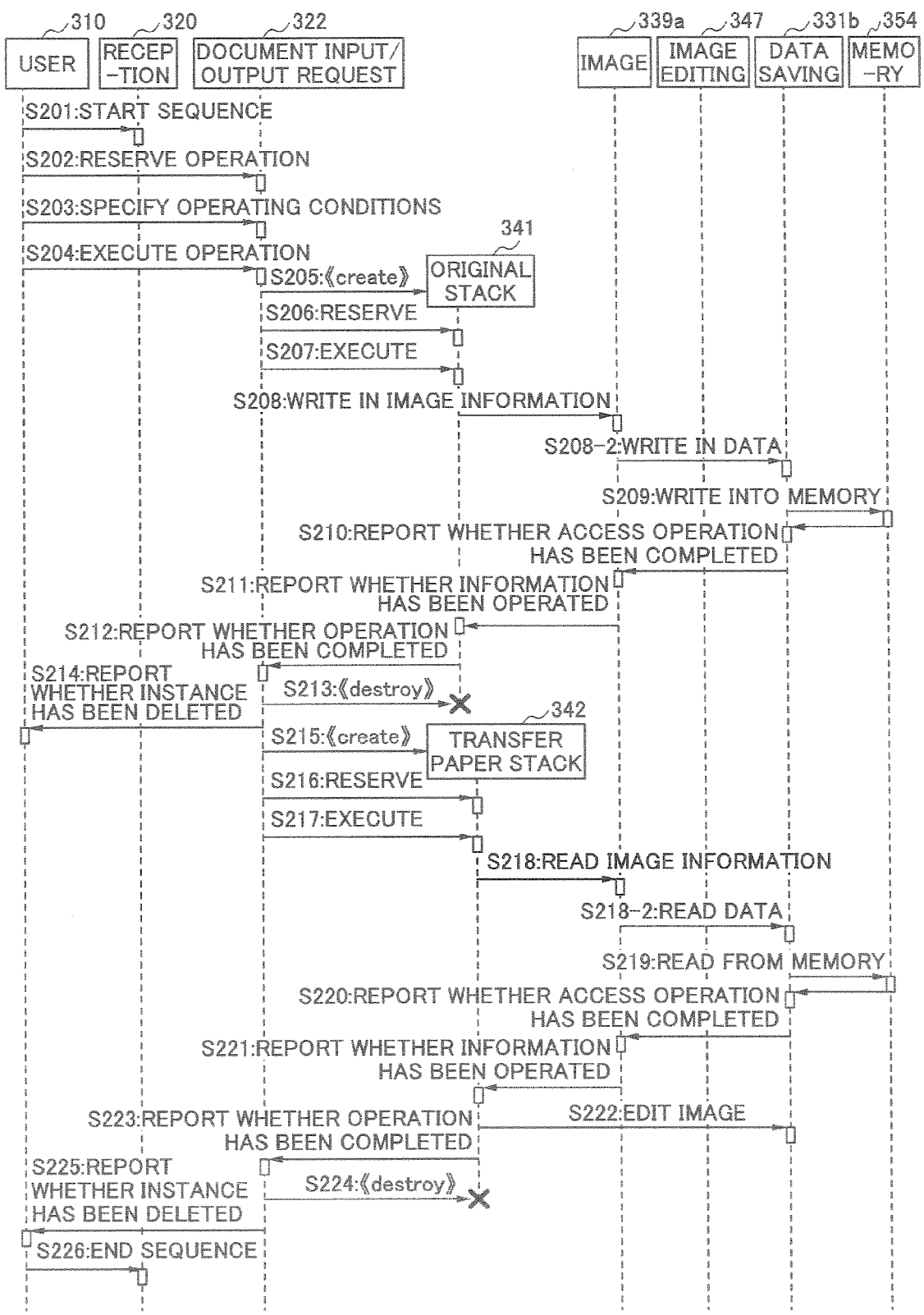
FIG. 9 is a process sequence diagram of a process of printing a paper original.

FIG. 9 is a process sequence diagram of a process for printing a paper original. As shown in FIG. 9, the user class 310 reports to the reception class 320 that a sequence has started (step S201). For example, the user class 310 reports to the reception class 320 that a sequence has started when the operations panel 16 is operated by a user to print a paper original.

The user class 310 reserves an operation of the document input/output request class 322 (step S202), specifies printing conditions input by the user with the operations panel 16 as operating conditions in the document input/output request class 322 (step S203), and requests the document input/output request class 322 to execute the operation (step S204).

The document input/output request class 322 creates an instance of the original stack class 341 of the device layer 34 (step S205), reserves a process of the instance of the original stack class 341 (hereinafter, simply referred to as "original stack class 341") (step S206), and requests the original stack class 341 to execute the process (step S207).

The original stack class 341 of the device layer 34 sends a request to the image class 339a to write the image information scanned from the paper original into a storage area in response to the request to execute the process from the document input/output request class 322 of the business layer 32 (step S208). The image class 339a sends a request to the data saving class 331b to write the data into a storage area for saving the image information (step S208-2). The data saving class 331b causes the memory class 354 of the common section 35 to write the image information received from the image class 339a into the storage area (step S209).

When the memory class 354 completes writing in the image information, the data saving class 331b reports whether the access operation has been completed to the image class 339a (step S210). The image class 339a reports whether information has been operated on to the original stack class 341 based on the report on whether the access operation has been completed from the data saving class 331b (step S211). The original stack class 341 reports whether the operation has been completed to the document input/output request class 322 based on the report on whether the information has been operated on from the image class 339a (step S212).

After receiving the report on whether the operation has been completed, the document input/output request class 322 deletes the instance of the original stack class 341 (step S213). The document input/output request class 322 reports whether the instance has been deleted to the user class 310 (step S214).

The document input/output request class 322 of the business layer 32 creates an instance of the transfer paper stack class 342 of the device layer 34 (step S215), reserves a process of the instance of the transfer paper stack class 342 (hereinafter, simply referred to as "transfer paper stack class 342") (step S216), and requests the transfer paper stack class 342 to execute the process (step S217).

The transfer paper stack class 342 of the device layer 34 sends a request to the image class 339a to read image information scanned from the paper original, in response to the request to execute the process from the document input/output request class 322 of the business layer 32 (step S218). The image class 339a sends a request to the data saving class 331b to read data in order to acquire the image information (step S218-2). The data saving class 331b causes the memory class 354 of the common section 35 to read the requested image information from the storage area (step S219).

When the memory class 354 completes reading the image information, the data saving class 331b reports whether the access operation has been completed to the image class 339a (step S220). The image class 339a reports whether the information has been operated on to the transfer paper stack class 342 based on the report on whether the access operation has been completed from the data saving class 331b (step S221).

After receiving the report on whether the information has been operated on, the transfer paper stack class 342 edits the image to print the image (step S222). The transfer paper stack class 342 reports whether the operation has been completed to the document input/output request class 322 based on the report on whether the information has been operated on from the image class 339a and results obtained by editing the image (step S223).

After receiving the report on whether the operation has been completed, the document input/output request class 322 deletes the instance of the transfer paper stack class 342 (step S224). The document input/output request class 322 reports whether the instance has been deleted to the user class 310 (step S225), reports to the reception class 320 that the sequence has ended (step S226), and ends the process of printing the paper original.

As described above, the document input/output request class 322 of the business layer 32 combines the original stack class 341 and the transfer paper stack class 342 of the device layer 34 to execute them as a sequence of processes for printing a paper original, in response to the request to print a paper original from the user class 310 of the presentation layer 31.

Figure 10:
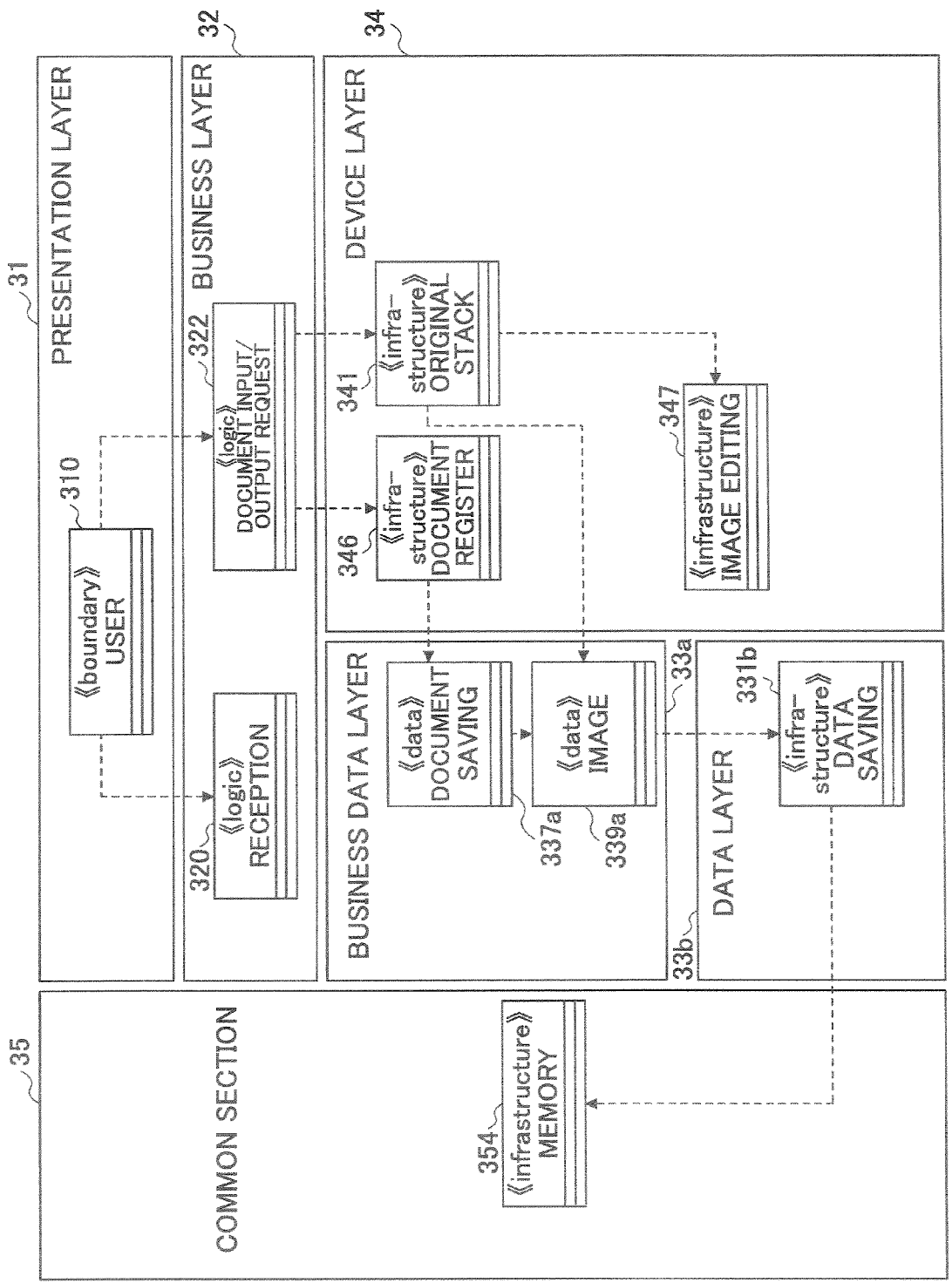
FIG. 10 is a class diagram illustrating a process of computerizing and saving a paper document.

FIG. 10 is a class diagram illustrating a process of computerizing and saving a paper document. As shown in FIG. 10, the user class 310 of the presentation layer 31 reports to the reception class 320 of the business layer 32 that a sequence has started, and sends a request to the document input/output request class 322 of the business layer 32 to computerize and save a paper document.

The document input/output request class 322 sends a request to the original stack class 341 of the device layer 34 to scan a paper original, and then sends a request to the document saving class 337a of the device layer 34 to read image information obtained by scanning the paper original, in response to the request to computerize and save a paper document from the user class 310.

The original stack class 341 causes the scan print engine 17 to send a request to the image class 339*a* to write the image information scanned from the paper original into a storage area, and the image class 339*a* causes the memory class 354 to write the image information into the storage area via the data saving class 331*b*. The image information is temporarily saved in the storage area. When a process to edit the image is included in the request from the document input/output request class 322, the original stack class 341 causes the image editing class 347 to edit the image information and causes the image class 339*a* to write the edited image information in the storage area.

The document register class 346 sends a request to the image class 339*a* to read the image information of the paper original from the storage area, and the image class 339*a* sends a request to the document saving class 337*a* to register the image information read from the memory class 354 as document information via the data saving class 331*b*.

As described above, the document input/output request class 322 of the business layer 32 combines the original stack class 341 of the device layer 34 and the document saving class 337*a* to execute them as a sequence of processes for computerizing and saving a paper document, in response to the request to computerize and save a paper original from the user class 310 of the presentation layer 31.

Figure 11:
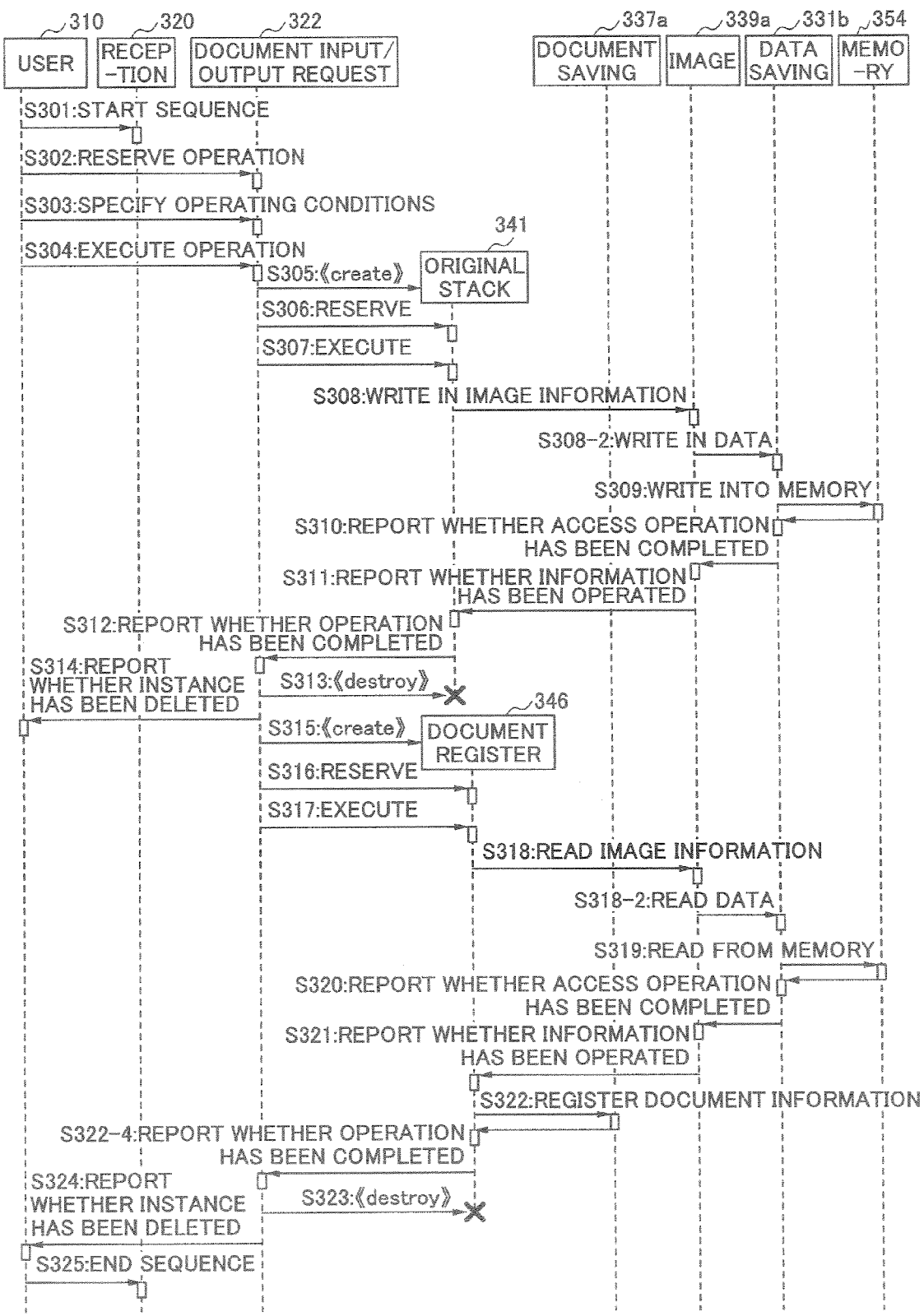
FIG. 11 is a process sequence diagram of a process of computerizing and saving a paper document.

FIG. 11 is a process sequence diagram of a process for computerizing and saving a paper document. As shown in FIG. 11, the user class 310 reports to the reception class 320 that a sequence has started (step S301). For example, the user class 310 reports to the reception class 320 that a sequence has started when the operations panel 16 is operated by a user to computerize and save a paper original.

The user class 310 reserves an operation of the document input/output request class 322 (step S302), specifies conditions of computerizing and saving the paper document input by the user with the operations panel 16 as operating conditions in the document input/output request class 322 (step S303), and requests the document input/output request class 322 to execute the operation (step S304).

The document input/output request class 322 creates an instance of the original stack class 341 of the device layer 34 (step S305), reserves a process of the instance of the original stack class 341 (hereinafter, simply referred to as "original stack class 341") (step S306), and requests the original stack class 341 to execute the process (step S307).

The original stack class 341 of the device layer 34 sends a request to the image class 339*a* to write the image information scanned from the paper document into a storage area (step S308) in response to the request to execute the process from the document input/output request class 322 of the business layer 32. The image class 339*a* sends a request to the data saving class 331*b* to write the data into a storage area for saving the image information (step S308-2). The data saving class 331*b* causes the memory class 354 of the common section 35 to write the image information received from the image class 339*a* into the storage area (step S309).

When the memory class 354 completes writing in the image information, the data saving class 331*b* reports whether the access operation has been completed to the image class 339*a* (step S310). The image class 339*a* reports whether the information has been operated on to the original stack class 341 based on the report on whether the access operation has been completed from the data saving class 331*b* (step S311). The original stack class 341 reports whether the operation has been completed to the document input/output request class 322 based on the report on whether the information has been operated on from the image class 339*a* (step S312).

After receiving the report on whether the operation has been completed, the document input/output request class 322 deletes the instance of the original stack class 341 (step S313). The document input/output request class 322 reports whether the instance has been deleted to the user class 310 (step S314).

The document input/output request class 322 of the business layer 32 creates an instance of a document register class 346 of the device layer 34 (step S315), reserves a process of the instance of the document register class 346 (hereinafter, simply referred to as "document register class 346") (step S316), and requests the document register class 346 to execute the process (step S317).

The document register class 346 of the device layer 34 sends a request to the image class 339*a* to read image information scanned from the paper original, in response to the request to execute the process from the document input/output request class 322 of the business layer 32 (step S318). The image class 339*a* sends a request to the data saving class 331*b* to read data in order to acquire the image information (step S318-2). The data saving class 331*b* causes the memory class 354 of the common section 35 to read the requested image information from the storage area (step S319).

When the memory class 354 completes reading the image information, the data saving class 331*b* reports whether the access operation has been completed to the image class 339*a* (step S320). The image class 339*a* reports whether the information has been operated on to the document register class 346 based on the report on whether the access operation has been completed from the data saving class 331*b* (step S321).

After receiving the report on whether the information has been operated on, the document register class 346 sends a request to the document saving class 337*a* to register the image information read by the image class 339*a* as document information (step S322). The document register class 346 reports whether the operation has been completed to the document input/output request class 322 based on results obtained by the registration process (step S322-4).

After receiving the report on whether the operation has been completed, the document input/output request class 322 deletes the instance of the document register class 346 (step S323). The document input/output request class 322 reports whether the instance has been deleted to the user class 310 (step S324), reports to the reception class 320 that the sequence has ended (step S325), and ends the process of computerizing and saving the paper document.

As described above, the document input/output request class 322 of the business layer 32 combines the original stack class 341 of the device layer 34 and the document saving class 337*a* to execute them as a sequence of processes for computerizing and saving the paper document, in response to the request to computerize and save the paper document from the user class 310 of the presentation layer 31.

Figure 12:
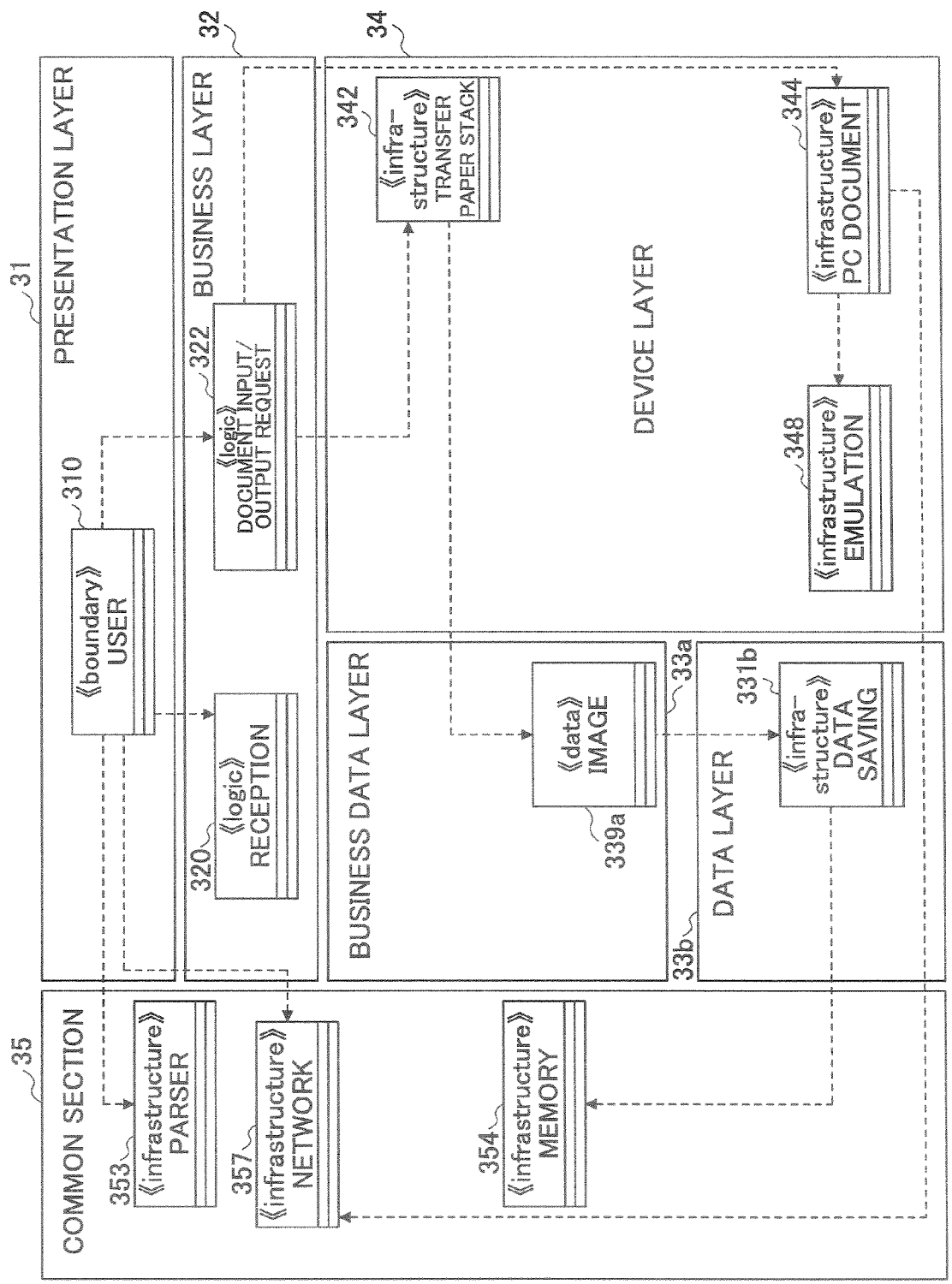
FIG. 12 is a class diagram illustrating a process of printing a PC document.

FIG. 12 is a class diagram illustrating a process of printing a PC document. As shown in FIG. 12, when the user class 310 of the presentation layer 31 receives a request from the network class 357, the user class 310 causes the parser class 353 to analyze the received request. Based on results of the analysis, the user class 310 reports to the reception class 320 of the business layer 32 that a sequence has started, and sends a request to the document input/output request class 322 of the business layer 32 to print the PC document.

The document input/output request class 322 sends a request to the PC document class 344 of the device layer 34 to receive a PC document, and then sends a request to the transfer paper stack class 342 of the device layer 34 to print out image information of the received PC document, in response to the request to print the PC document from the user class 310.

The PC document class 344 causes the network class 357 to receive the image (document), causes the emulation class 348 to convert the received image (document) to a predetermined format and acquire image information, and causes the image class 339a to write the image information into a storage area.

The transfer paper stack class 342 sends a request to the image class 339a to read the image information of the PC document, and the image class 339a causes the scan print engine 17 to print out the image information read from the memory class 354 via the data saving class 331b.

As described above, the document input/output request class 322 of the business layer 32 combines the PC document class 344 with the transfer paper stack class 342 in the device layer 34 to execute them as a sequence of processes for printing a PC document, in response to a request to print the PC document from the user class 310 of the presentation layer 31.

Figure 13:
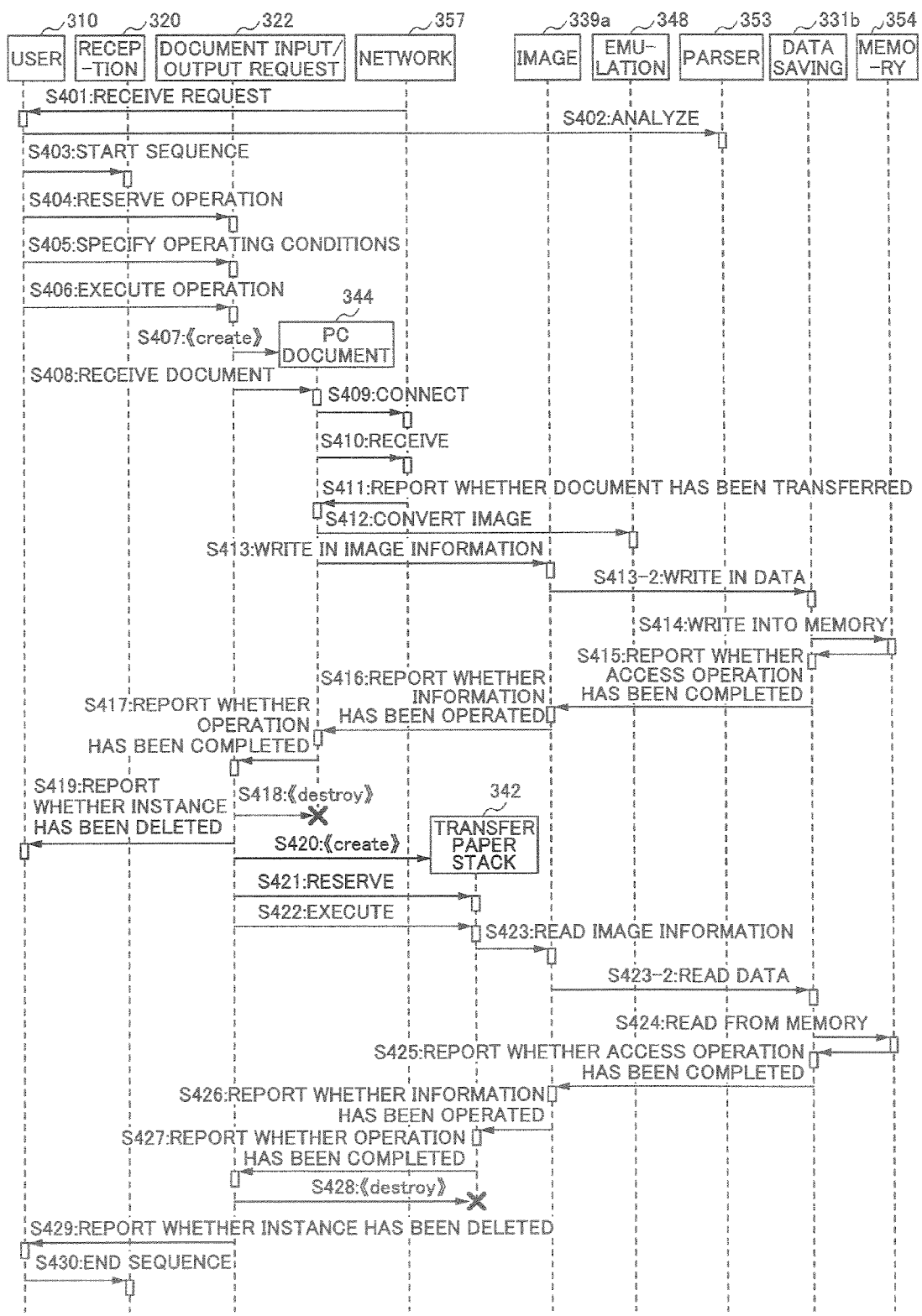
FIG. 13 is a process sequence diagram of a process of printing a PC document.

FIG. 13 is a process sequence diagram of a process for printing a PC document. As shown in FIG. 13, when a request is received from the network class 357 (step S401), the user class 310 causes the parser class 353 to analyze the received request (step S402) For example, the user class 310 receives a request to receive a document from the network class 357. The user class 310 reports to the reception class 320 that a sequence has started (step S403). In this case, the process does not start when the operations panel 16 is operated by a user, and therefore, the user class 310 internally sends a report to the reception class 320 that a sequence has started.

The user class 310 reserves an operation of the document input/output request class 322 (step S404), specifies conditions for receiving the document as operating conditions in the document input/output request class 322 (step S405), and requests the document input/output request class 322 to execute the operation (step S406).

The document input/output request class 322 creates an instance of the PC document class 344 of the device layer 34 (step S407), and sends a request to the PC document class 344 to receive the document (step S408).

The PC document class 344 sends a request to the network class 357 to connect with the request source in response to the request from the document input/output request class 322 of the business layer 32 to receive the document (step S409), and sends a request to receive the document (step S410). When the document is received, the network class 357 reports to the PC document class 344 whether the document has been transferred (step S411).

The PC document class 344 sends a request to the emulation class 348 to convert the received image (document) (step S412). The emulation class 348 converts the received image (document) into a predetermined format of the image processing apparatus 100 and acquires image information. Then, the document class 344 sends a request to the image class 339a to cause the emulation class 348 to write the converted image information in a storage area (step S413). The image class 339a sends a request to the data saving class 331b to write the data into a storage area for saving the image information (step S413-2). The data saving class 331b causes the memory class 354 of the common section 35 to write the image information received from the image class 339a into the storage area (step S414).

When the memory class 354 completes writing in the image information, the data saving class 331b reports whether the access operation has been completed to the image class 339a (step S415). The image class 339a reports whether the information has been operated on to the PC document class 344 based on the report from the data saving class 331b (step S416). The PC document class 344 reports whether the operation has been completed to the document input/output request class 322 based on the report from the image class 339a (step S417).

After receiving the report on whether the operation has been completed, the document input/output request class 322 deletes the instance of the PC document class 344 (step S418). The document input/output request class 322 reports whether the instance has been deleted to the user class 310 (step S419).

The document input/output request class 322 of the business layer 32 creates an instance of the transfer paper stack class 342 of the device layer 34 (step S420), reserves a process of the instance of the transfer paper stack class 342 (hereinafter, simply referred to as "transfer paper stack class 342") (step S421), and requests the transfer paper stack class 342 to execute the process (step S422).

The transfer paper stack class 342 of the device layer 34 sends a request to the image class 339a to read the image information in response to the request to execute the process from the document input/output request class 322 of the business layer 32 (step S423). The image class 339a sends a request to the data saving class 331b to read data in order to acquire the image information (step S423-2). The data saving class 331b causes the memory class 354 of the common section 35 to read the requested image information from the storage area (step S424).

When the memory class 354 completes reading the image information, the data saving class 331b reports whether the access operation has been completed to the image class 339a (step S425). The image class 339a reports whether the information has been operated on to the transfer paper stack class 342 based on the report from the data saving class 331b whether the access operation has been completed (step S426).

After receiving the report on whether the information has been operated on, the transfer paper stack class 342 reports whether the operation has been completed to the document input/output request class 322 (step S427).

After receiving the report on whether the operation has been completed, the document input/output request class 322 deletes the instance of the transfer paper stack class 342 (step S428). The document input/output request class 322 reports whether the instance has been deleted to the user class 310 (step S429), reports to the reception class 320 that the sequence has ended (step S430), and ends the process of printing the PC document.

As described above, the document input/output request class 322 of the business layer 32 combines the PC document class 344 and the transfer paper stack class 342 of the device layer 34 to execute them as a sequence of processes for printing a PC document, in response to the request to print a PC document from the user class 310 of the presentation layer 31.

Figure 14:
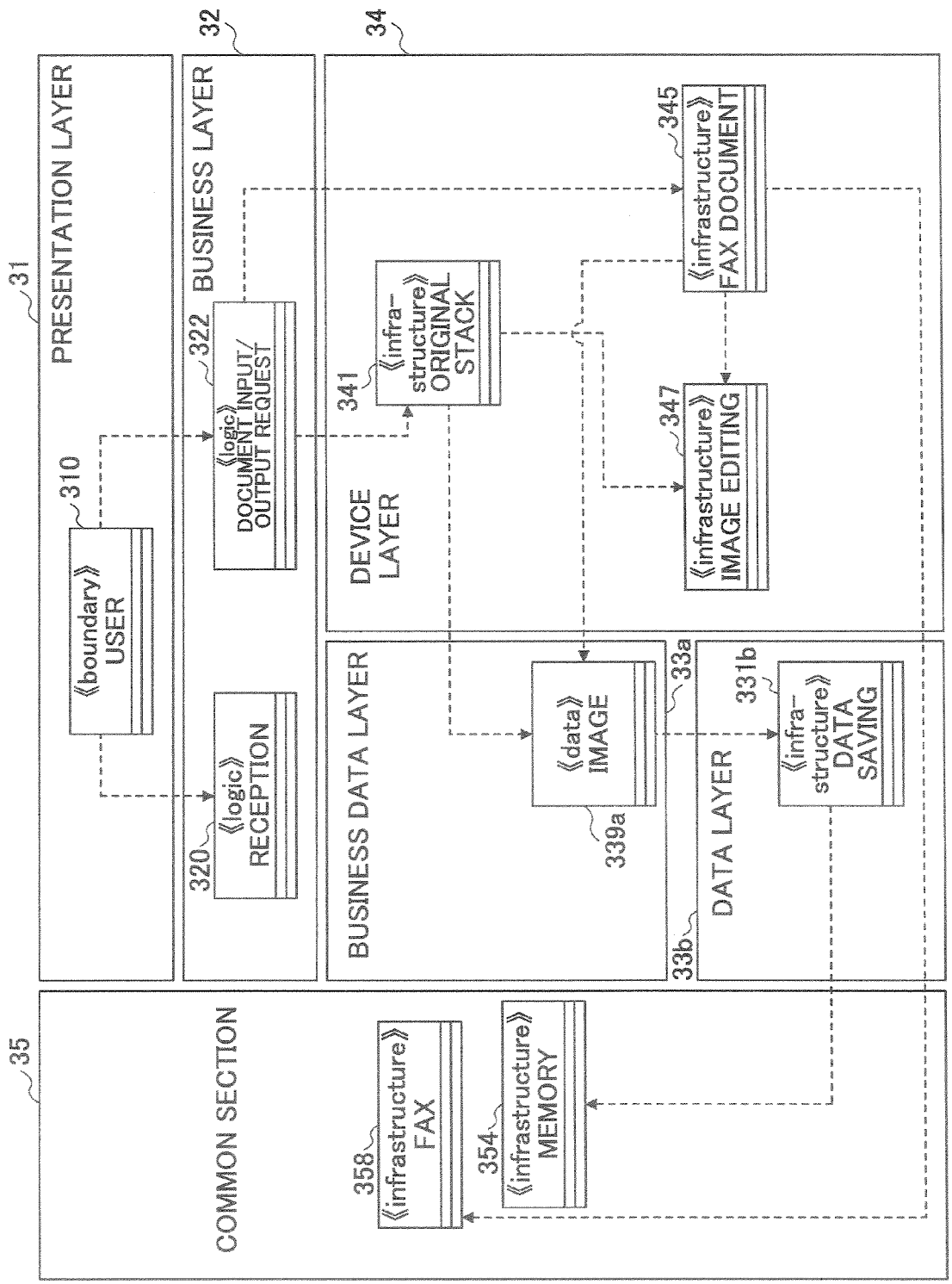
FIG. 14 is a class diagram illustrating a process of sending out a paper original by fax transmission.

FIG. 14 is a class diagram illustrating a process of sending out a paper original by fax transmission. As shown in FIG. 14, the user class 310 of the presentation layer 31 reports to the reception class 320 of the business layer 32 that a sequence has started, and sends a request to the document input/output request class 322 of the business layer 32 to send out a paper original by fax transmission.

The document input/output request class 322 sends a request to the original stack class 341 of the device layer 34 to scan a paper original, and then sends a request to the fax document class 345 of the device layer 34 to transmit a document obtained by scanning the paper original, in response to the request from the user class 310 to send out the paper original by fax transmission.

The original stack class 341 causes the scan print engine 17 to send a request to the image class 339a to write image information scanned from the paper original into a storage area, and the image class 339a causes the memory class 354 to write the image information into the storage area via the data saving class 331b. The image information is temporarily saved in the storage area. When a process to edit the image is included in the request from the document input/output request class 322, the original stack class 341 causes the image editing class 347 to edit the image information and causes the image class 339a to write the edited image information in the storage area.

The fax document class 345 sends a request to the image class 339a to read the image information of the paper original from the storage area, the image class 339a causes the image editing class 347 to edit the image information read from the memory class 354 via the data saving class 331b, and causes the fax class 358 to transmit the edited image to the transmission destination.

As described above, the document input/output request class 322 of the business layer 32 combines the original stack class 341 with the fax document class 345 in the device layer 34 to execute them as a sequence of processes for sending out a paper original by fax transmission, in response to a request from the user class 310 of the presentation layer 31 to send out a paper original by fax transmission.

Figure 15:
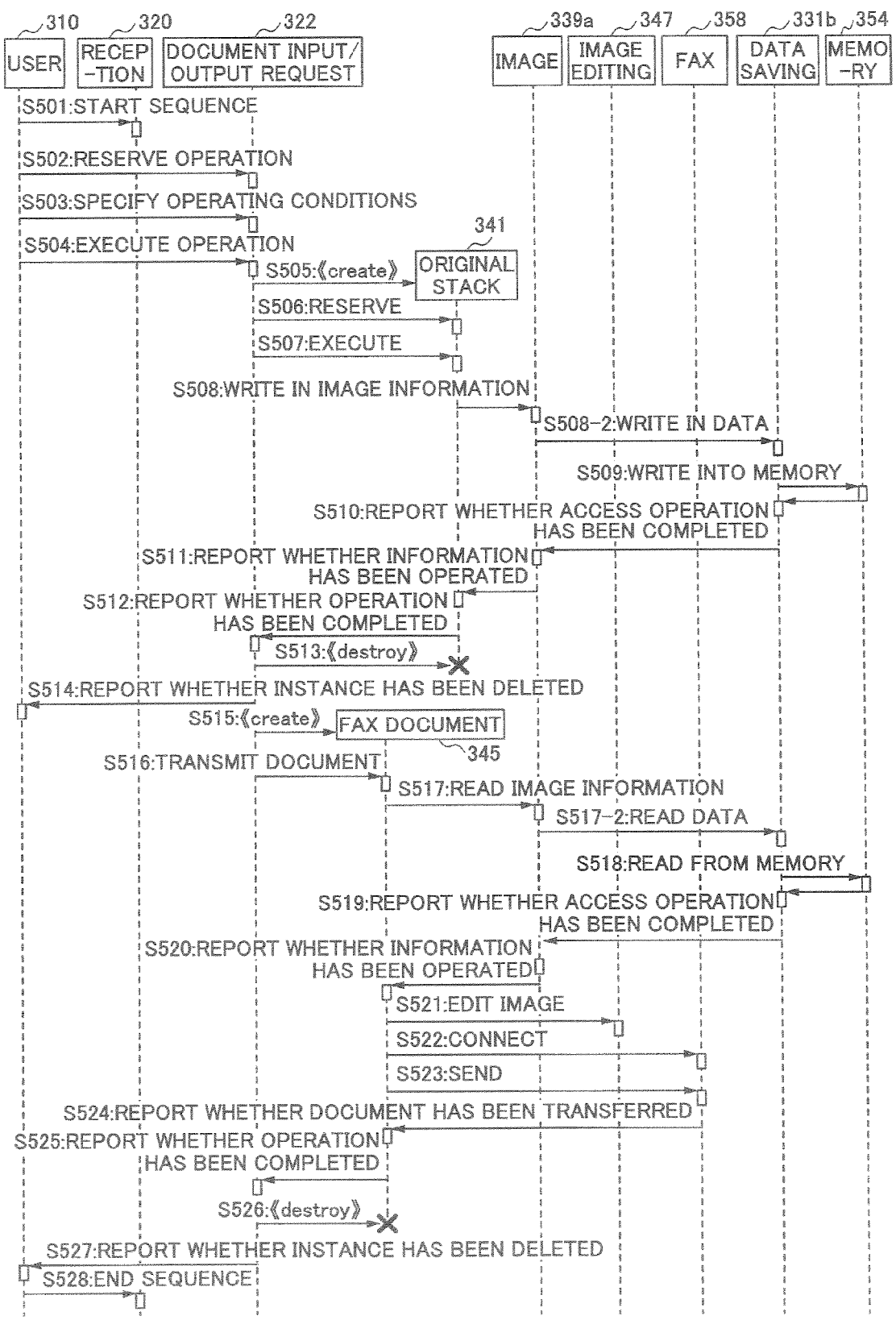
FIG. 15 is a process sequence diagram of a process of sending out a paper original by fax transmission.

FIG. 15 is a process sequence diagram of a process for sending out a paper original by fax transmission. As shown in FIG. 15, the user class 310 reports to the reception class 320 that a sequence has started (step S501). For example, the user class 310 reports to the reception class 320 that a sequence has started when the operations panel 16 is operated by a user to send out the paper original by fax transmission.

The user class 310 reserves an operation of the document input/output request class 322 (step S502), specifies conditions for sending out the paper original by fax transmission input by the user with the operations panel 16 as operating conditions in the document input/output request class 322 (step S503), and requests the document input/output request class 322 to execute the operation (step S504).

The document input/output request class 322 creates an instance of the original stack class 341 of the device layer 34 (step S505), reserves a process of the instance of the original stack class 341 (hereinafter, simply referred to as "original stack class 341") (step S506), and requests the original stack class 341 to execute the process (step S507).

The original stack class 341 of the device layer 34 sends a request to the image class 339a to write image information scanned from the paper original into a storage area in response to the request to execute the process from the document input/output request class 322 of the business layer 32 (step S508). The image class 339a sends a request to the data saving class 331b to write the data into a storage area for saving the image information (step S508-2). The data saving class 331b causes the memory class 354 of the common section 35 to write the image information received from the image class 339a into the storage area (step S509).

When the memory class 354 completes writing in the image information, the data saving class 331b reports whether the access operation has been completed to the image class 339a (step S510). The image class 339a reports whether the information has been operated on to the original stack class 341 based on the report from the data saving class 331b whether the access operation has been completed (step S511).

The original stack class 341 reports whether the operation has been completed to the document input/output request class 322 based on the report from the image class 339a whether the information has been operated on (step S512).

After receiving the report on whether the operation has been completed, the document input/output request class 322 deletes the instance of the original stack class 341 (step S513). The document input/output request class 322 reports whether the instance has been deleted to the user class 310 (step S514).

The document input/output request class 322 of the business layer 32 creates an instance of the fax document class 345 of the device layer 34 (step S515), and sends a request to the instance of the fax document class 345 (hereinafter, simply referred to as "fax document class 345") to transmit the document (step S516).

The fax document class 345 of the device layer 34 sends a request to the image class 339a to read the image information scanned from the paper original in response to the request from the document input/output request class 322 of the business layer 32 (step S517). The image class 339a sends a request to the data saving class 331b to read data in order to acquire the image information (step S517-2). The data saving class 331b causes the memory class 354 of the common section 35 to read the requested image information from the storage area (step S518).

When the memory class 354 completes reading the image information, the data saving class 331b reports whether the access operation has been completed to the image class 339a (step S519). The image class 339a reports whether the information has been operated on to the fax document class 345 based on the report from the data saving class 331b whether the access operation has been completed (step S520).

After receiving the report on whether the information has been operated on, the fax document class 345 edits the image to be sent out by fax transmission (step S521). The fax document class 345 sends a connection request to the fax class 358 (step S522), and requests the fax class 358 to transmit the document (image) (step S523).

The fax class 358 sends out the document (image) by fax transmission by controlling the modem 10. The fax class 358 reports whether the document (image) has been sent out to the fax document class 345 (step S524).

After receiving the report on whether the document (image) has been sent out, the fax document class 345 reports whether the operation has been completed to the document input/output request class 322 based on the report on whether the document (image) has been sent out from the fax class 358 (step S525).

After receiving the report on whether the operation has been completed, the document input/output request class 322 deletes the instance of the fax document class 345 (step S526). The document input/output request class 322 reports whether the instance has been deleted to the user class 310 (step S527), reports to the reception class 320 that the sequence has ended (step S528), and ends the process of printing the paper original.

Figure 16:
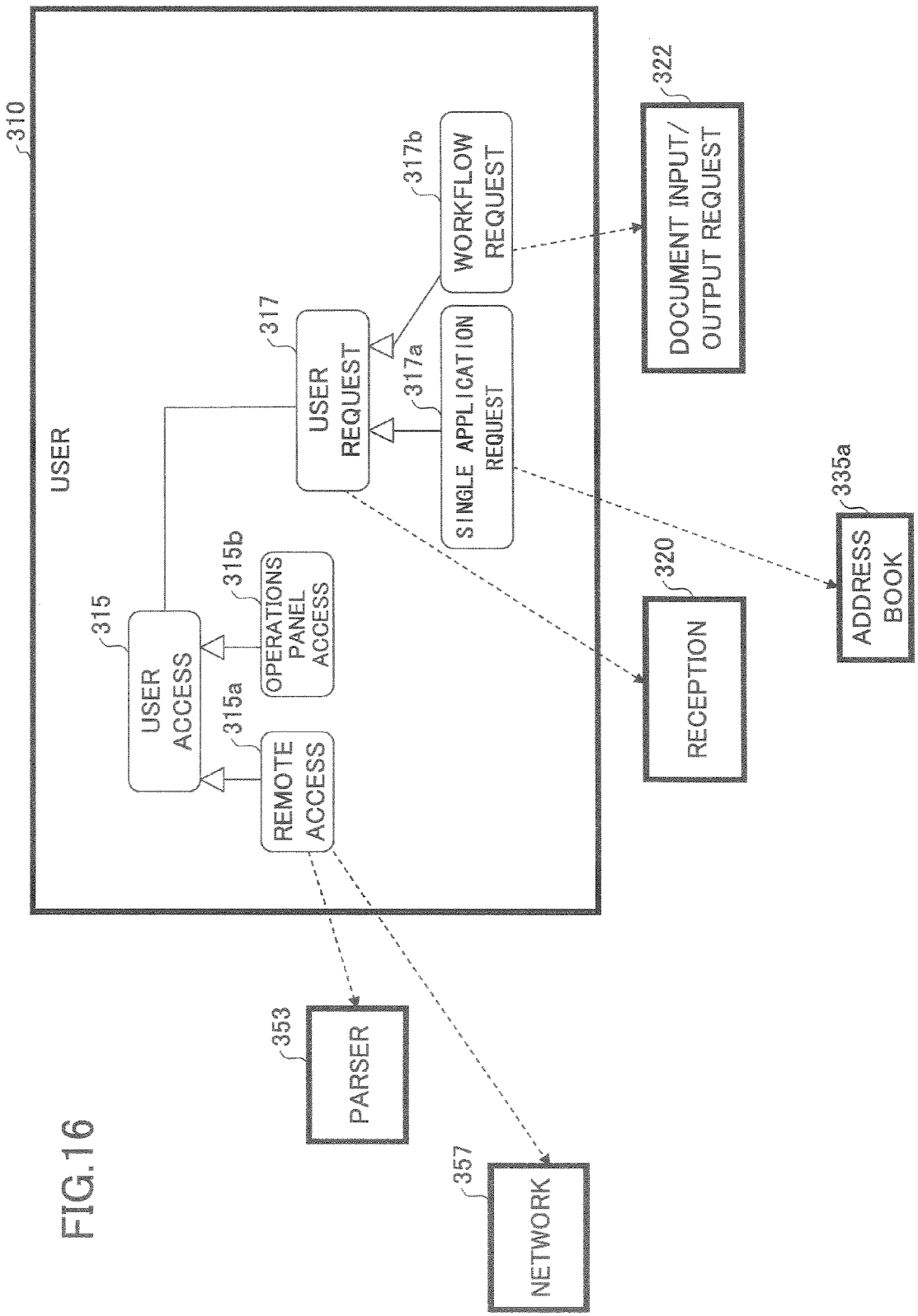
FIG. 16 illustrates an internal class configuration of a user class.

FIG. 16 illustrates an internal class configuration of the user class 310. As shown in FIG. 16, the user class 310 includes a user access class 315 and a user request class 317. The user access class 315 and the user request class 317 are associated with each other.

Furthermore, the user access class 315 performs a process to receive an access from outside. The user access class 315 includes a remote access class 315a that receives and processes a remote access made via the network 20 and an operations panel access class 315b that receives and processes an access made via a user interface by the panel controller 6. The remote access class 315a and the operations panel access class 315b are sub-classes of the user access class 315.

The remote access class 315a receives, in cooperation with the network class 357, an access via the network 20 and interprets, in cooperation with the parser class 353, the contents of the received access. For example, the remote access class 315a receives document data to be printed out.

The user request class 317 receives a request and instructs lower layers to perform processes according to the request. The user request class 317 includes a single application request class 317a for causing lower layers to perform a process according to a request made to a single application and a workflow request class 317b for combining plural function process units together by forming a workflow and causing lower layers to perform a sequence of processes. The single application request class 317a and the workflow request class 317b are sub-classes of the user request class 317.

After the user request class 317 causes the reception class 320 to receive a request, either one of the single application request class 317a or the workflow request class 317b operates according to the type of the request. For example, the single application request class 317a sends an instruction to the address book class 335a and the workflow request class 317b sends an instruction to document input/output request class 322.

Figure 17:
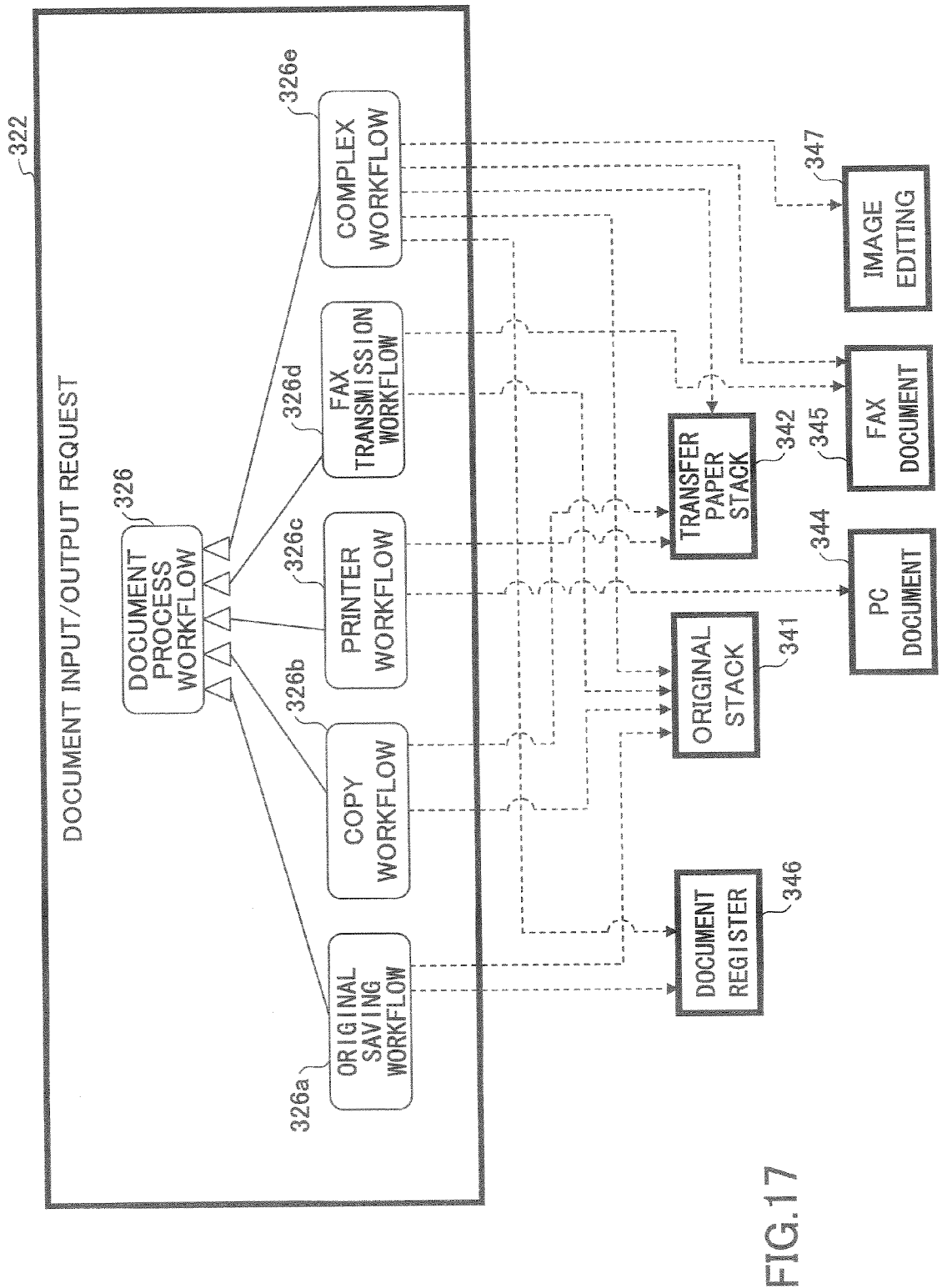
FIG. 17 illustrates an internal class configuration of a document input/output request class.

FIG. 17 illustrates an internal class configuration of the document input/output request class 322. As shown in FIG. 17, the document input/output request class 322 includes a document process workflow class 326 that instructs a workflow to perform a process according to a request from the user class 310.

The document process workflow class 326 includes an original saving workflow class 326a for saving image information scanned from an original in a storage area, a copy workflow class 326b for copying an original, a printer workflow class 326c for printing out document data received via the network 20, a fax transmission workflow class 326d for scanning a document and sending out the document by fax transmission, and a complex workflow class 326e for performing complex processes by executing plural image processing procedures that function in cooperation with each other. The original saving workflow class 326a, the copy workflow class 326b, the printer workflow class 326c, the fax transmission workflow class 326d, and the complex workflow class 326e are sub-classes of the document process workflow class 326.

The original saving workflow class 326a realizes an original saving application that performs a sequence of processes to scan an original and save it in a storage area by combining the original stack class 341 and the document register class 346. Examples of detailed mechanisms of an original saving application are shown in the class diagram shown in FIG. 10 and the process sequence diagram shown in FIG. 11.

The copy workflow class 326b realizes a copy application that performs a sequence of processes to copy an original by combining the original stack class 341 and the transfer paper stack class 342. Examples of detailed mechanisms of a copy application are shown in the class diagram shown in FIG. 8 and the process sequence diagram shown in FIG. 9.

The printer workflow class 326c realizes a printer application that performs a sequence of processes to print out document data received via the network 20 by combining the PC document class 344 and the transfer paper stack class 342. Examples of detailed mechanisms of a printer application are shown in the class diagram shown in FIG. 12 and the process sequence diagram shown in FIG. 13.

The fax transmission workflow class 326d realizes a fax application that performs a sequence of processes to perform fax transmission by combining the original stack class 341 and the fax document class 345. Examples of detailed mechanisms of a fax application are shown in the class diagram shown in FIG. 14 and the process sequence diagram shown in FIG. 15.

The complex workflow class 326e realizes a cooperative application that performs complex processes by executing plural image processes that function in cooperation with each other by combining the original stack class 341, the document register class 346, the transfer paper stack class 342, the image editing class 347, and the fax document class 345.

Figure 18:
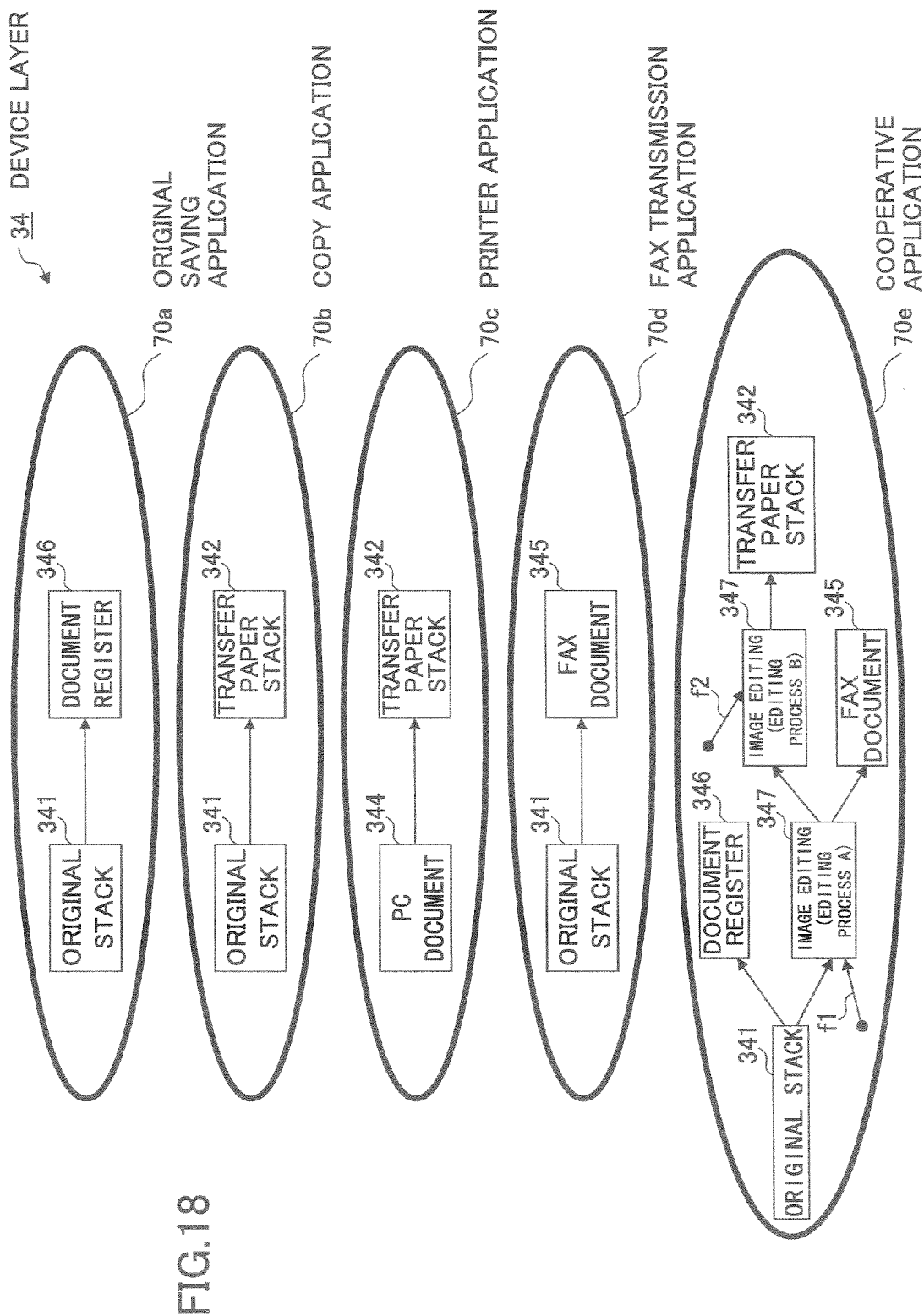
FIG. 18 illustrates examples of combinations of plural function process units in each application.

Each of the applications in the device layer 34 realized by workflows of the document input/output request class 322 are schematically illustrated in FIG. 18. FIG. 18 illustrates examples of combinations of plural function process units in each of the applications. In FIG. 18, the arrows between the function process units represented by classes indicate the order of processes in the device layer 34 following the workflows of the document input/output request class 322.

In FIG. 18, an original saving application 70a is realized by a process performed by the original stack class 341 followed by a process performed by the document register class 346. A copy application 70b is realized by a process performed by the original stack class 341 followed by a process performed by the transfer paper stack class 342.

A printer application 70c is realized by a process performed by the PC document class 344 followed by a process performed by the transfer paper stack class 342. A fax transmission application 70d is realized by a process performed by the original stack class 341 followed by a process performed by the fax document class 345.

A cooperative application 70e includes a workflow including a process performed by the original stack class 341 followed by a process performed by the document register class 346, and a workflow including a process performed by the original stack class 341 followed by an editing process A performed by the image editing class 347, which is followed by a process performed by the fax document class 345. There is also a workflow including an editing process B performed by the image editing class 347 after the editing process A performed by the image editing class 347, followed by a process performed by the transfer paper stack class 342. For example, when combining two pages onto one page (editing process A) and the printing the date or a time stamp onto the copy (editing process B), the image editing class 347 is caused to consecutively perform processes.

Furthermore, as shown in FIG. 3, the document input/output request class 322 can directly instruct the image editing class 347 to perform a process. Therefore, it is possible to form a workflow including the editing process A performed by the image editing class 347 to process document data saved in a storage area, followed by a process performed by the fax document class 345 (flow from the arrow f1).

Similarly, the document input/output request class 322 can form a workflow including an editing process B performed by the image editing class 347 to process document data saved in a storage area, followed by a process performed by the transfer paper stack class 342 (flow from the arrow f2).

As described above, it is possible to edit an image starting from an arbitrary timing.

Figure 19:
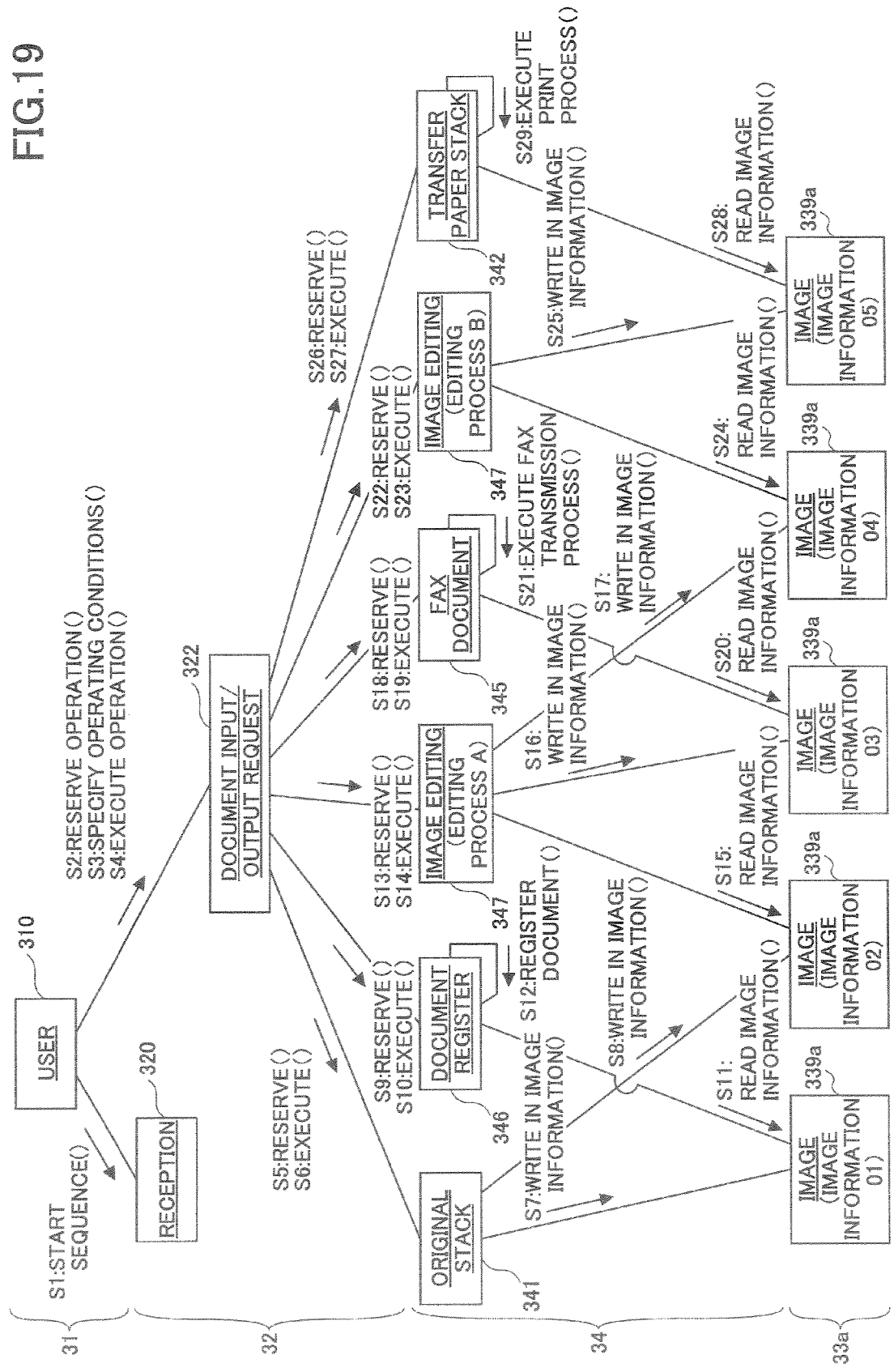
FIG. 19 illustrates examples of collaborations for performing a cooperative application shown in FIG. 18.

The process flow between plural classes and collaboration of classes indicating the order of the processes for executing the cooperative application 70e shown in FIG. 18 are described with reference to FIG. 19. FIG. 19 illustrates examples of collaborations for performing the cooperative application 70e shown in FIG. 18.

As shown in FIG. 19, the user class 310 reports to the reception class 320 that a sequence has started in response to a request from the network 20 or the operations panel 16 (step S1).

The user class 310 reserves an operation of the document input/output request class 322 (step S2), specifies operating conditions (step S3), and instructs the document input/output request class 322 to execute the operation (step S4).

The document input/output request class 322 reserves a process of the original stack class 341 to scan an original (step S5) and sends a request to execute the scanning (step S6). The original stack class 341 sends a request to the image class 339a to write image information scanned from the original into a storage area as image information 01 to register the image information (step S7), and sends a request to the image class 339a to write the image information into the storage area as image information 02 to edit the image information (step S8).

The document input/output request class 322 reserves a process of the document register class 346 to register a document (step S9) and requests the document register class 346 to execute the process of registering the document (step S10). The document register class 346 sends a request to the image class 339a to read the image information 01 from the storage area (step S11) and executes a document registration process on the image information 01 read from the storage area (step S12).

The document input/output request class 322 reserves a process of the image editing class 347 (step S13) and requests the image editing class 347 to execute the editing process A (step S14). The image editing class 347 sends a request to the image class 339a to read the image information 02 (step S15), and when the editing process A is performed on the image information 02, the image editing class 347 sends a request to the image class 339a to write the image information 02 on which the editing process A is performed into the storage area as image information 03 (step S16). The image editing class 347 sends a request to the image class 339a to write the image information 03 into the storage area as image information 04 in order to perform another editing process (step S17).

The document input/output request class 322 reserves a process of the fax document class 345 (step S18), and requests the fax document class 345 to execute facsimile transmission (step S19). The fax document class 345 sends a request to the image class 339a to read the image information 03 (step S20), and executes a fax transmission process to send the image information 03 to the designated destination (step S21).

The document input/output request class 322 reserves a process of the image editing class 347 (step S22) and requests the image editing class 347 to execute the editing process B (step S23). The image editing class 347 requests the image class 339a to read the image information 04 (step S24), and when the editing process B is performed on the image information 04, the image editing class 347 sends a request to the image class 339a to write the image information 04 on which the editing process B is performed into the storage area as image information 05 (step S25).

The document input/output request class 322 reserves a printing process of the transfer paper stack class 342 (step S26), and requests the transfer paper stack class 342 to execute printing (step S27). The transfer paper stack class 342 requests the image class 339a to read the image information 05 from the storage area (step S28), and executes a printing process to print out the image information 05 (step S29).

The image processing apparatus 100 includes the following layers, starting from the top layer (the closest layer to the user of the image processing apparatus 100): the presentation layer 31 and the business layer 32, the business data layer 33a and the data layer 33b pertaining to data access serving as lower layers of the business layer 32, and the device layer 34. Furthermore, the image processing apparatus 100 includes the common section 35 that is directly accessible from each of the presentation layer 31, the business layer 32, the data layer 33b, and the device layer 34.

Each of the processes can be started from the user class 310 of the presentation layer 31. Therefore, in the business layer 32, the classes of the data layer 33b or the device layer 34 serving as function process units are combined and the order of executing the classes is controlled according to a request from the user class 310. Such a workflow based on a unified concept can be realized as an application.

Furthermore, in the present invention, the device layer 34 configures the functions pertaining to image processing procedures performed by the image processing apparatus 100. Therefore, the business layer 32 can realize various workflows by combining together the function process units of the device layer 34, such as a workflow for performing image processing procedures of a scanner, a printer, a fax machine, etc., or a workflow of a document processor for managing an image of a document generated by performing image processing.

Each workflow is a combination of function process units. Therefore, compared to the conventional technology of developing each workflow as an individual application, the workload required to develop an application can be reduced according to an embodiment of the present invention.

A request analyzing layer, a workflow control layer, and a resource control layer described in the claims correspond to the presentation layer 31, the business layer 32, and the device layer 34 described in the embodiments, respectively.

The present invention is not limited to the specifically disclosed embodiment, and variations and modifications may be made without departing from the scope of the present invention.

The present application is based on Japanese Priority Patent Application No. 2006-027251, filed on Feb. 3, 2006 and Japanese Priority Patent Application No. 2007-011722, filed on Jan. 22, 2007, the entire contents of which are hereby incorporated by reference.

What is claimed is:

1. An image processing apparatus for executing an application relevant to image processing, comprising:
    a request analyzing layer configured
        to analyze a user-specified request requesting a service,
        to determine whether the requested service requires a single application and does not involve the image processing or image editing by conveying a physical sheet of paper, or a workflow that includes combining together a plurality of function process units to perform the image processing by conveying the physical sheet of paper and performing at least one of scanning, printing, fax transmission and image editing,
        to send an instruction to a workflow control layer to form the workflow to be executed as the application, when it is determined that the requested service requires the workflow, and
        to send an instruction to an object corresponding to the single application to be executed as the application, when it is determined that the requested service requires the single application; and
a processor that executes the application, wherein
the workflow control layer is configured to control the workflow and create logic corresponding to the requested service by combining the plurality of function process units to serve as the application, the workflow control layer including:
   a document input/output request object that issues a request to objects in a lower level, each of which corresponding to one of the function process units included in the workflow, in order to conduct a series of processes in the workflow in response to an instruction from the request analyzing layer, and
   a process flow control unit configured to control an order in which the function process units of the workflow are to be executed.

2. The image processing apparatus according to claim 1, wherein the process flow control unit executes the workflow only when the instruction is received from the request analyzing layer.

3. The image processing apparatus according to claim 1, wherein the request analyzing layer further comprises a single service process unit configured to analyze the user-specified request requesting the service and to send the instruction to the workflow control layer.

4. The image processing apparatus according to claim 3, wherein the service process unit provided in the request analyzing layer includes
   an access receiving section configured to receive an access made to the image processing apparatus, and
   a request receiving section configured to start a process upon receiving the user-specified request requesting the service designated by the access received by the access receiving section.

5. The image processing apparatus according to claim 1, further comprising:
   a resource control layer including one or more of the function process units each configured to control resources relevant to the image processing in response to receiving a request from the workflow control layer.

6. The image processing apparatus according to claim 5, wherein the resource control layer includes an internal process section configured to be executed in response to a request from any one of the function process units of the resource control layer that receives the request from the workflow control layer.

7. The image processing apparatus according to claim 5, wherein the resource control layer includes one or more internal process sections each configured to execute a process in response to a request from any one of the function process units of the resource control layer that receives the request from the workflow control layer, and
   a function process unit that receives the request from the workflow control layer controls an internal workflow including a combination of the one or more internal process sections.

8. The image processing apparatus according to claim 6, wherein
   the resource control layer includes
      a scanning section, serving as one of the function process units, configured to scan one or more originals and generate image information based on a scanned original, and
      a transfer process section, serving as one of the function process units, configured to transfer the image information onto a predetermined medium, and
      when the instruction received from the request analyzing layer is a print request, the workflow control layer is configured to perform a printing process workflow by controlling the request sent to the resource control layer so as to be sent first to the scanning section and then to the transfer process section.

9. The image processing apparatus according to claim 6, wherein
   the resource control layer includes
      a scanning section, serving as one of the function process units, configured to scan one or more originals and generate image information based on a scanned original, and
      a register section, serving as one of the function process units, configured to register the image information so as to save the image information into a storage area, and
      when the instruction received from the request analyzing layer is a saving request to save the image information of the original, the workflow control layer is configured to perform a saving process workflow by controlling the request sent to the resource control layer so as to be sent first to the scanning section and then to the register section.

10. The image processing apparatus according to claim 6, wherein
    the resource control layer includes
       a document data process section, serving as one of the function process units, configured to receive document data from outside and store the document data in a storage section as image information, and
       a transfer process section, serving as one of the function process units, configured to transfer the image information onto a predetermined medium, and
       when the instruction received from the request analyzing layer is a print request to print the document data, the workflow control layer is configured to perform a document data printing process workflow by controlling the request sent to the resource control layer so as to be sent first to the document data process section and then to the transfer process section.

11. The image processing apparatus according to claim 6, wherein
    the resource control layer includes
       a scanning section, serving as one of the function process units, configured to scan one or more originals and generate image information based on a scanned original, and
       a fax transmission section, serving as one of the function process units, configured to transmit and receive the image information by facsimile transmission, and
       when the instruction received from the request analyzing layer is a fax transmission request, the workflow control layer is configured to perform a fax transmission process workflow by controlling the request sent to the resource control layer so as to be sent first to the scanning section and then to the fax transmission section.

12. The image processing apparatus according to claim 6, wherein the resource control layer includes an image editing process section, serving as the internal process section, configured to perform an editing process on image information.

13. The image processing apparatus according to claim 1, further comprising:
    a conceptual data layer configured to control access to data expressing a concept existing in real world as an entity, the conceptual data layer including a function process unit for each of one or more entities, wherein the one or more entities directly receive the instruction from the request analyzing layer.

14. The image processing apparatus according to claim 13, further comprising:

a data layer including one or more of the function process units each corresponding to a type of storage area, wherein a function process unit controls input and output of data to and from the corresponding type of storage area in response to receiving a request from the conceptual data layer.

15. The image processing apparatus according to claim 1, further comprising:

a common section including one or more of the function process units directly accessible from other layers.

16. An image processing method for executing an application relevant to image processing, comprising:

starting a service in response to a user-specified request requesting the service, a first step being performed in a request analyzing layer that analyzes the user-specified request to determine whether the requested service requires a single application and does not involve the image processing or image editing by conveying a physical sheet of paper, or a workflow that includes combining together a plurality of function process units to perform the image processing by conveying the physical sheet of paper and performing at least one of scanning, printing, fax transmission and image editing, sends an instruction to a workflow control layer to form the workflow to be executed as the application, when it is determined that the requested service requires the workflow, and sends an instruction to an object corresponding to the single application to be executed as the application, when it is determined that the requested service requires the single application; and executing the application, wherein the workflow control layer, upon receiving the instruction sent to the workflow control layer, creates logic corresponding to the requested service by combining the plurality of function process units to configure the workflow and serve as the application, sends requests to one or more objects in a lower level, each of which corresponding to one of one or more function process units included in the workflow, in response to an instruction from the request analyzing layer, and controls an order in which the function process units of the workflow are to be executed.

* * * * *